United States Patent [19]
Edgar et al.

[11] Patent Number: 5,884,240
[45] Date of Patent: Mar. 16, 1999

[54] APPARATUS FOR MEASURING AND RECORDING A TREE CHARACTERISTIC

[75] Inventors: Kevin D. Edgar; Jeffrey L. Edgar, both of Manitowoc; Klaus A. Wieder, Helenville; Jeff F. Falbo, Milwaukee; Robert E. Radke; Richard J. Radke, both of Brown Deer, all of Wis.

[73] Assignee: Silver Creek Nurseries Inc., Manitowoc, Wis.

[21] Appl. No.: 685,835

[22] Filed: Jul. 24, 1996

[51] Int. Cl.⁶ ........................................ G06F 19/00
[52] U.S. Cl. .................. 702/157; 364/474.1; 33/780; 144/357
[58] Field of Search ............... 364/561, 474.01–474.09, 364/474.1; 33/784, 783, 811, 143 L, 141 E, 123, 780; 702/157, 155–158; 144/357

[56] References Cited

U.S. PATENT DOCUMENTS

| | | | |
|---|---|---|---|
| 4,176,458 | 12/1979 | Dunn ..................................... | 33/141 E |
| 4,226,024 | 10/1980 | Westerberg et al. ................... | 33/143 C |
| 4,459,749 | 7/1984 | Rieder et al. ......................... | 33/125 C |
| 4,549,355 | 10/1985 | Sauer et al. .......................... | 33/148 M |
| 4,612,656 | 9/1986 | Suzuki et al. ............................. | 377/24 |
| 4,845,646 | 7/1989 | Marquis et al. ........................ | 364/560 |
| 4,930,096 | 5/1990 | Shimizu et al. ........................ | 364/550 |
| 5,022,162 | 6/1991 | Luikko ..................................... | 33/784 |
| 5,029,402 | 7/1991 | Lazecki et al. . | |
| 5,095,638 | 3/1992 | David et al. ............................. | 33/783 |
| 5,208,997 | 5/1993 | Tas .......................................... | 33/783 |
| 5,249,366 | 10/1993 | Takahashi et al. ..................... | 33/811 |
| 5,253,431 | 10/1993 | Smith . | |
| 5,337,488 | 8/1994 | Lemelson ................................. | 33/784 |
| 5,457,635 | 10/1995 | Scott ..................................... | 364/474.13 |

FOREIGN PATENT DOCUMENTS

| | | |
|---|---|---|
| 2587104 | 3/1987 | France . |
| 2589565 | 5/1987 | France . |
| 3330396 | 3/1985 | Germany . |
| 2188426 | 9/1987 | United Kingdom . |

*Primary Examiner*—Kamini Shah
*Attorney, Agent, or Firm*—Nilles & Nilles SC

[57] ABSTRACT

An apparatus for measuring and storing a tree characteristic that preferably is tree diameter and other data related to location, variety and grade of a tree being measured. The apparatus has a handle, a wand extending therefrom, and a measurement head carried by the wand for measuring diameter. The wand has a control handle connected by a cable to a movable caliper jaw carried by the head to measure a diameter of a tree between the movable jaw and another jaw. A vernier having measurement locator slots and a home position slot is carried by the cable and communicates with slot sensors that send signals to an on-board computer to determine direction and distance of jaw movement for enabling the distance between the jaws to be determined. Two optoisolators and the computer comprise a jaw motion and direction detecting quadrature detector. A third optoisolator detects when the movable jaw is in its home position. The computer includes a microcontroller, a memory for storing tree data, a port for transferring stored data from memory to a PC, and inputs for selecting and storing data. A memory cartridge can be used to store tree data. Software running on the PC enables data to be downloaded, sorted, stored, displayed or printed. The software is also used to configure cartridges by downloading at least a portion of a master list of locations and varieties to a cartridge being configured that can later be selected in the field during apparatus operation.

62 Claims, 10 Drawing Sheets

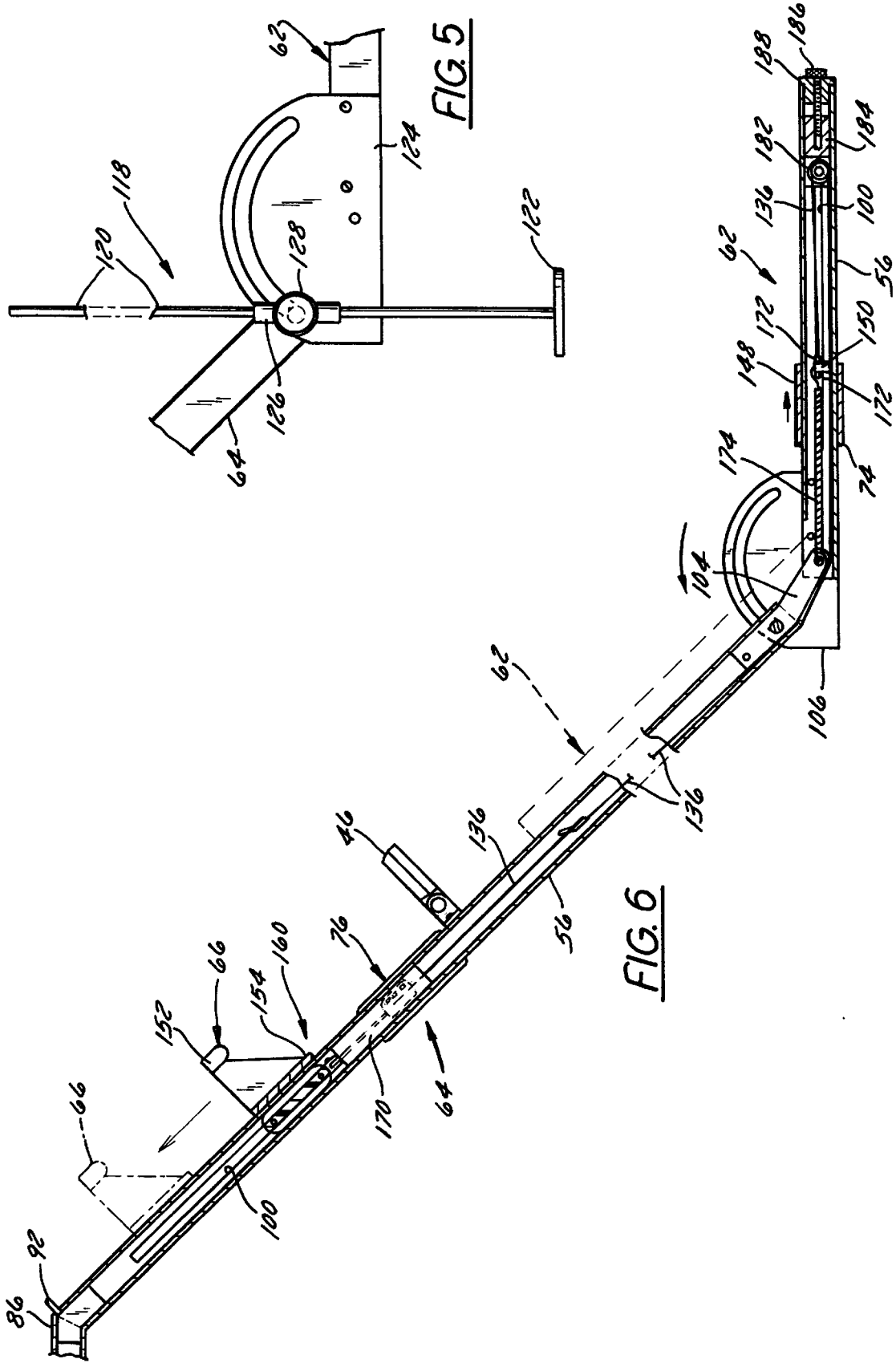

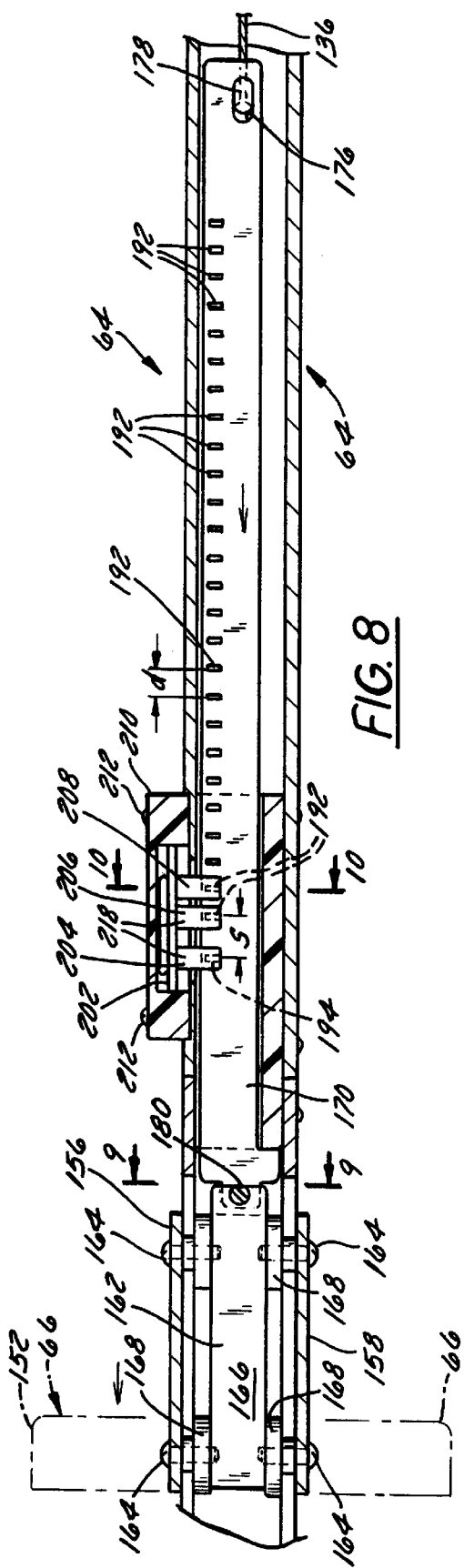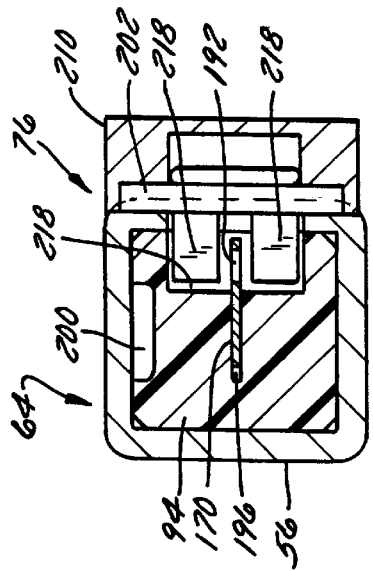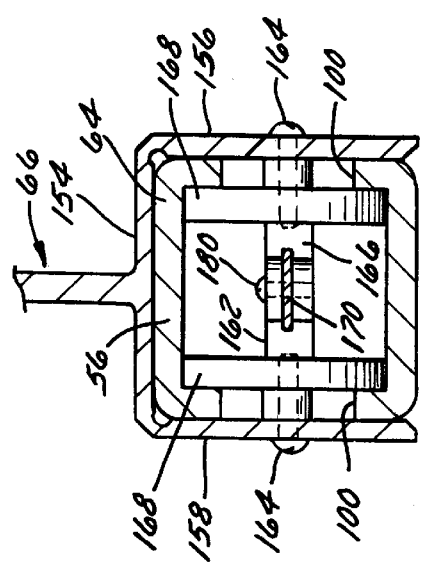

APPARATUS FOR MEASURING AND RECORDING A TREE CHARACTERISTIC

Reference is made to microfiche source code Appendices A and B both of which are expressly incorporated by reference herein. Appendix A is a single microfiche containing 62 frames and Appendix B is a single microfiche containing 67 frames.

FIELD OF THE INVENTION

This invention relates generally to an apparatus for measuring a characteristic of a tree that preferably is tree diameter and more particularly to a method and apparatus for measuring and recording the diameter of a tree as well other tree information for inventorying that tree and a plurality of other trees.

BACKGROUND OF THE INVENTION

In many businesses related to the forestry and nursery industries, the measurement and recording of certain tree characteristic information, such as tree diameter, location, quality or grade, type of tree and the like, are determined and recorded for the purpose of making an inventory. For the forestry industry, inventorying large stands of trees can help determine or approximate the future value of the lumber that will be harvested when the trees are cut down. Likewise, in the nursery industry, inventorying nursery tree stock is also important for determining the value of the trees that will be sold during the upcoming sales season. Inventorying a nurseries' stock of trees is also important so that the nursery knows how many trees of a particular variety, grade and size it can sell during the sales season.

In the past, inventorying trees has largely been performed manually using a caliper-like device to measure tree diameter and writing down the information in a paper inventory log. Typically, for the nursery industry, inventory information for each tree includes the location of the tree, the type or variety of the tree, the grade or quality of the tree, as well as the diameter of the tree. Unfortunately, manual recording of this information is slow and labor intensive, especially when it is considered that the manually recorded information is usually later manually transcribed or rerecorded into a computer.

In an attempt to address at least some of these challenges as they are presented in the lumber industry, Luikko, U.S. Pat. No. 5,022,162, discloses an electronic caliper having a display and means for inputting alphanumeric information into a record that can be stored in a computer memory. To determine the diameter of a log, a moveable jaw is slid by an operator of the caliper toward a fixed jaw of the caliper until the two jaws bear against the log. When performing this measurement, the distance between the two jaws is shown in the display. Thereafter, a switch is pressed to enter the measurement shown in the display of the caliper into memory. To selectively input other numbers, and even letters, when prompted, the movable jaw of the caliper is moved along an arm of the caliper by the operator until the jaw indicates the desired number or letter and thereafter the switch is pressed to enter the selection into memory.

Unfortunately, this method of data entry is rather slow and tedious, requiring the operator to spend a considerable amount of time to manually slide the jaw along the arm to take a measurement before entering it into memory. Additionally, the operator must spend valuable time to directly manipulate the moveable jaw to select a desired number or letter before entering it into memory. Moreover, a person using such a caliper must undesirably bend down or kneel, if measuring the diameter of the trunk of a standing tree close to the base or bottom of the tree being measured, further wasting time and quite possibly causing discomfort to the operator if a large number of trees are being measured. Although the apparatus disclosed in the Luikko patent may be better suited for inventorying cut logs that have been horizontally stacked, its poor ergonomics make it poorly suited for inventorying vertically standing trees and, more particularly, for inventorying large groups of standing trees. Finally, as a result of these drawbacks, the apparatus disclosed in the Luikko patent is simply impractical for use in quickly inventorying large stands of trees having, for example, two hundred or more trees.

SUMMARY OF THE INVENTION

An apparatus for measuring and recording tree data, including preferably the location, variety, size and grade of a tree. In a preferred embodiment of the measurement apparatus of this invention, this tree data can be selected, measured and recorded for a plurality of trees.

Preferably, the size of the tree measured includes its diameter and is measured using a measurement apparatus of this invention that has a measurement head that is connected by an extension wand to a support handle. To measure a tree, the measurement head has a caliper with a pair of jaws and at least one movable jaw that is in operable communication with a sensor and on-board computer constructed and arranged for measuring the distance between the caliper jaws and displaying the measurement on a display.

To enable tree size to be measured in a fast and automated manner, the on-board computer communicates with the sensor which, in turn, communicates with the caliper jaws during measurement. To enable the measurement to be stored, the on-board computer communicates with a memory storage device that preferably is a removable memory cartridge.

The tree measurement apparatus has a frame which includes the measurement head, an extension wand, and a support handle. The portion of the frame that makes up the measurement head, extension wand and support handle is preferably hollow or has hollow portions for enabling cabling and wires to be routed therethrough and for minimizing the weight of the apparatus. In a preferred embodiment, the frame portions of the measurement head, extension wand, and support handle are constructed of a metal that preferably is a relatively lightweight aluminum or a steel.

Preferably, the longitudinal axis of the support handle forms an obtuse included angle with the longitudinal axis of the extension wand and the measurement head is attached to the wand at an angle relative to the wand such that the head is generally horizontal relative to the ground when the measurement apparatus is being supported by the operator. To help adjust the relative angle between the head and wand to better facilitate positioning the head relative to the ground and a tree being measured, the head is attached to the wand by a pivot and adjustable bracket.

A connector elbow having a first mounting stem obtusely angled relative to a second mounting stem joins the support handle to the wand and imparts the desired obtuse relative angle between them. A second mounting elbow joins the wand to the measurement head and preferably also has obtusely angled mounting stems. In a preferred embodiment of the mounting elbow, one of the mounting stems is telescopically received in a hollow of the frame of one of the wand or measurement head and the other of the mounting stems is joined by a pivot pin and adjustable bracket to the other of the wand and measurement head. Preferably, one of the elbow stems is telescopically received in a hollow of the wand the other of the stems is joined by a pivot pin and adjustable bracket to the measurement head.

Preferably, both elbows are constructed of a strong, lightweight and resilient material that is a polymer or plastic, such as a polyurethane or the like. Alternatively, one or both elbows can be constructed of a composite material, steel, aluminum, another metal or another suitable material.

Preferably, the adjustable bracket is constructed and arranged to permit the relative angle between the longitudinal axis of the wand and the longitudinal axis of the measurement head to be selectively varied. Preferably, the bracket permits adjustment such that the measurement head can be moved between being obtusely angled relative to the wand to being acutely angled relative to the wand. Preferably, bracket permits adjustment of the head from between about 135° to about 0°. When substantially located at 0°, the longitudinal axis of the measurement head is substantially parallel to the longitudinal axis of the wand permitting the head to be folded against the wand for compact storage of the measurement apparatus.

The support handle has a handle grip adjacent its free end that is grasped by an operator of the apparatus during operation. The on-board computer is carried by the support handle and communicates with a data entry switch located between the on-board computer module and handle grip. The data entry switch or other on-board computer input preferably is located adjacent the grip and within the reach of a forefinger or thumb of an operator's hand grasping the grip for facilitating quick, easy and efficient data entry.

To enable tree diameter to be measured, the extension wand has a control handle that preferably is operably connected to at least one of the caliper jaws to move at least one of the jaws. During operation, the control handle can be manipulated to move at least one of the jaws toward the other of the jaws to engage a tree located between the jaws so that the diameter of the tree can be determined where the jaws engage the tree.

In a preferred measurement head embodiment, one of the jaws is movable and the other of the jaws is fixed. Preferably, the control handle is manipulated during operation by moving the control handle relative to the extension wand along a pair of guide slots in the wand frame to cause displacement of the movable jaw. Preferably, the measurement head, extension wand and control handle are constructed and arranged such that movement of the control handle substantially simultaneously moves the movable jaw. To move the movable jaw, the control handle is attached to the jaw by a flexible motion transmitter that preferably is a cable received in a hollow of the extension wand and measurement head.

To enable the control handle to move, the control handle has a handle grip connected to a base that is attached to a movable carriage that is received within a hollow of the extension wand. The movable carriage has two pairs of spaced apart wheels that ride along an inner surface of the measurement wand frame to help smoothly move and guide the control handle as it is moved along the guide slots. Preferably, the length of the guide slots substantially controls the maximum distance of travel of the movable jaw. Preferably, the control handle, carriage and wheels are constructed of a strong, lightweight, durable and resilient material that preferably is a polyurethane, a vinyl, a polymer, a plastic, a composite, a metal, another suitable material, or combination of suitable materials.

The motion transmitting cable is operably connected at one end to the control handle carriage and at its other end to the movable jaw. The cable preferably passes through the wand and measurement head and is looped around a pulley at the free end of the measurement head before it operably connects to the movable jaw. To urge the movable jaw toward an open position, a biasing element that preferably is a tension spring is operably connected to the movable jaw and the pivot pin connects together the measurement head and wand.

In a preferred measurement head embodiment, the jaws form a caliper for enabling measurement of the diameter of a tree located between its jaws. Each jaw has a base and a fin extending outwardly from the base with one edge of each fin forming a tree engaging surface that bears against an exterior surface of a tree during tree diameter measurement. The fixed jaw is affixed to the frame of the measurement head while the movable jaw is slidably carried by the measurement head frame. During operation, the movable jaw can be moved from a fully open start or home position to a position where it is completely closed such that the tree engaging surfaces of the jaws substantially bear against each other.

To allow relative movement along the measurement frame, the base of the movable jaw is a hollow sleeve of generally square or rectangular cross section that is telescoped over the free end of the measurement head frame before the fixed jaw is attached to the measurement head frame. To attach the movable jaw to the motion transmitting cable and biasing spring, the sleeve has an inwardly extending tab that is received in a longitudinal slot in the measurement head frame. The tab preferably also helps to guide movement of the movable jaw longitudinally along the measurement head frame as it rides in the guide slot in the measurement head frame.

To support the cable pulley, there is a pulley suspension body with a pair of spaced apart arms received adjacent the free end of the measurement head frame with the pulley being journalled for rotation on a pin received between the arms of the body. To permit some adjustment of the location of the home or start position of the movable jaw relative to the fixed position of the fixed jaw, the pulley suspension body is attached by a threaded fastener to a plug received in the free end of the measurement head frame. To adjust the location of the movable pulley home or start position, the fastener can be rotated in one direction to move the pulley suspension body and movable jaw toward the free end of the measurement head frame and can be rotated in the opposite direction to move the pulley suspension body and movable jaw away from the free end of the measurement head frame. To visually confirm the measured distance between the tree engaging surfaces of the jaws shown on the display, there is a scale or ruler affixed to the measurement head frame adjacent the jaws.

Measurement of the distance between tree engaging surfaces of the jaws is facilitated by a sensor in communication with at least one of the jaws. In a preferred embodiment, the sensor is carried by the extension wand frame and communicates to the on-board computer movement of the movable jaw relative to its home/start position. Preferably, the home/start position of the movable jaw coincides with its fully open position. The on-board computer preferably displays the distance between the two tree engaging surfaces of the jaws in real time and permits entry and memory storage of the distance upon pressing the data entry switch. When the switch is pressed, the distance between the two jaws is stored preferably in the memory chip of a memory storage cartridge that is connected to the measurement apparatus and which is in communication with the on-board computer.

To sense movement of the movable jaw, the sensor has a pickup that extends into a hollow of the extension wand that communicates with a reader tape or vernier tape that has a plurality of spaced apart locator slots and which is carried by the motion transmitting cable. The sensor pickup reads these slots as the tape passes by and sends signals to the on-board computer. These signals are interpreted by the on-board computer and its operating code to calculate the distance the movable jaw has moved by determining the distance the movable jaw has moved relative to its home or start position. Since the distance of the fixed jaw relative to the home/start position is known, the on-board computer uses this relative movable jaw position information to calculate and display the distance between the two tree engaging surfaces of the jaws.

Preferably, the vernier tape connects the movable carriage of the control handle to the motion transmitting cable. Alternatively, the vernier tape can simply be carried by the cable, the control handle, the control handle carriage, or the movable jaw. Alternatively, if desired, the tape can connect the cable to the movable jaw with the sensor pickup being located adjacent the tape at the measurement head.

Preferably, the vernier tape has a first array of measurement locator slots having each pair of adjacent measurement locator slots spaced apart from each other by a first fixed distance. The measurement locator slots are read by the sensor pickup and enable the on-board computer to determine direction of movable jaw movement and the distance the movable jaw is located from the home or start position. To enable determination of when the movable jaw is in the home or start position, the vernier tape has a home or start position locator slot that communicates with the sensor pickup to cause the sensor to signal the on-board computer when the movable jaw is in the home or start position.

The sensor pickup preferably comprises three spaced apart optoisolator slot sensors with each of the optoisolators having one arm containing a light energy emitter spaced apart from and generally aligned with another arm containing a light energy detector. Preferably, the light energy emitter is a light emitting diode (LED) emitting infrared light energy. Preferably, the detector is a phototransistor or photoresistor. Preferably, the arms of each optoisolator are spaced sufficiently far enough apart to permit passage of the vernier tape and its locator slots as the movable jaw is being moved.

The pickup includes a pair of measurement optoisolators that are spaced apart from each other so as to detect the direction of movement of and distance traveled by the vernier tape. Preferably, these measurement optoisolators are spaced apart from each other a distance that is not equal to the distance between adjacent pairs of measurement locator slots of the vernier tape. Preferably, the measurement optoisolators are spaced apart by a distance that is greater or less than the distance between adjacent pairs of measurement locator slots.

Another optoisolator is positioned to sense when the movable jaw is in the home or start position by sensing or detecting when the home/start position locator slot in the vernier tape is located between the emitter and detector of the home position optoisolator. Preferably, the home/start position is sensed or detected when a slot is generally aligned with each of the three optoisolators causing all three of the optoisolators to signal the on-board computer substantially simultaneously causing the on-board computer to reset an internal tree diameter measurement counter or register to correspond to the distance between the jaws when the movable jaw is fully opened in its home/start position.

To help accurately locate the locator slots of the vernier tape relative to the emitter and detector arms of the optoisolators, the wand has a vernier tape guide received within a hollow portion of its frame. The tape guide has a pocket for receiving the arms of the optoisolators and a longitudinally extending channel for receiving the tape. An edge of the channel preferably serves as a guide for guiding the edge of the vernier tape so its locator slots are accurately positioned relative to the optoisolators so they can be accurately sensed, read or detected by the optoisolators when they pass by them during operation.

So that electric cabling can be passed through the tape guide, the guide preferably has a conduit or channel that extends substantially the length of the guide. To facilitate assembly of the control handle carriage, the tape guide preferably is a coupling that connects together two sections of the extension wand frame.

The on-board computer preferably comprises at least one circuit board containing computer circuitry that reads and interprets the signals from the optoisolators and data entry switch to enable the distance between the jaws to be determined, displayed and selectively stored.

The circuit board is received in a housing that is carried by the frame of the support handle and is preferably located adjacent the support handle grip within arm's reach of an operator of the measurement apparatus. To facilitate data selection and computer circuit operation, the housing has a keypad with input keys that are in communication with the circuit board. To enable data transfer from the memory storage cartridge, the housing preferably has a communications port that is also in communication with the circuit board.

To provide electrical power to the computer circuitry, there is an electrical power source that preferably is a battery, or the like, and a power supply circuit that regulates electrical power supplied to the circuitry. A POWER key of the keypad preferably is connected to a flip-flop that controls operation of a transistor that introduces electrical power to a voltage regulator of the supply circuit when the POWER key is pressed. Voltage from the regulator is supplied to the various components of the computer circuit.

The on-board computer comprises a microprocessor that preferably is a microcontroller that communicates with the optoisolators, memory storage, display, the keypad, and data entry switch. The microcontroller has operating code that instructs how various inputs and outputs are to operate during use and operation of the measurement apparatus. The operating code executed by a central processing unit of the microcontroller preferably is stored in programmable read-only memory (PROM) that is in communication with the microcontroller. The microcontroller also communicates with a random access memory (RAM) to help temporarily store information in registers defined by the operating code of the microcontroller.

The microcontroller has a set of inputs connected to the outputs of the optoisolators for receiving signals from the optoisolators. The output of each optoisolator is connected to a separate input of the microcontroller. To help condition the electrical signal from each optoisolator so that it is in a digitally readable format able to be read by the microcontroller, there is an inverter between the output of each optoisolator and the associated input of the microcontroller. Each inverter conditions the optoisolator output signal by squaring up the leading and trailing edges of the signal. Together, the microcontroller and optoisolators form a quadrature detector that is capable of detecting both the direction of movement of the vernier tape and the distance the vernier tape is from the home/start position.

The microcontroller has a set of data lines and control lines for controlling operation of the display enabling alphanumeric characters to be displayed during operation. Preferably, the display is a liquid crystal diode (LCD) display capable of displaying at least about two rows of twenty characters each. To store and read data from the memory storage device, the microcontroller has a set of data lines, a set of address lines, and a set of control lines in communication with the memory storage device. Preferably, the memory storage device is an electro programmable read-only memory integrated circuit or a flash memory device.

To facilitate sending data to and receiving data from a personal computer connected to the communications port, the microcontroller has a group of communication and control outputs and inputs in communication with a communications port conditioning chip located between the communications port and the microcontroller communications inputs and outputs. Preferably, the microcontroller communication inputs and outputs are for serial data communication. Preferably, the communications port is an RS232 port capable of bidirectional serial data transfer for enabling the memory storage device of the cartridge to transfer its stored tree data from the cartridge to a personal computer linked to the communications port. Preferably, the communications port conditioning chip is a line driver/receiver capable of matching the voltage of the chip communication and control inputs and outputs to the voltage corresponding to the communication and control inputs and outputs of the personal computer. Preferably, an inverter is connected between one of the control lines of the RS232 port and an interrupt of the microcontroller to facilitate putting the microcontroller into a communications mode when a cable is connected between the RS232 port of the measurement apparatus and an RS232 port of the personal computer.

The keypad has a number of keys with their outputs connected to a bank of inputs of the microcontroller that are scanned by the microcontroller during operation to execute a corresponding routine of the microcontroller operating code when a key is pressed. The keypad preferably has a POWER key for powering up and powering down the computer circuitry, a RESET key for resetting the microcontroller and putting the microcontroller into a mode which enables communication over the communications port when a cable is connected between its RS232 port and an RS232 port of a personal computer, an ERASE key for erasing data inputted, and UP and DOWN keys for scrolling upwardly and downwardly along a list of data shown in the display. The data entry switch preferably is also connected to at least one input of the microcontroller that is scanned during operation. Preferably, there is static electricity protection circuitry between the output of each key and switch input and its associated microcontroller input.

Preferably, the data entry switch has a first switch position that causes data to at least be temporarily stored by the microcontroller and a second position enabling selection from at least two data selection choices. Preferably, the first position is a position for entering and storing data, a second position for selecting data, and a third position where no data is entered, stored or selected. Preferably, the data selection position enables an operator of the measurement apparatus to select from between at least two quality values or grades. In a preferred implementation of a method of this invention, moving the switch to the data entry position after the desired tree grade has been selected causes the tree grade and diameter measurement to be stored in the memory storage cartridge.

In a preferred implementation of a method of operation of this invention, the operating code of the microcontroller communicates with tree location and tree variety lists preferably stored in the memory cartridge to enable the location and type of tree to be selected using the UP and DOWN keys and thereafter stored to the cartridge using the data entry switch. After tree location and variety are selected and stored, the apparatus is used to measure the diameter of a tree and select the grade. After the desired grade is selected and the diameter of the tree measured, the data entry switch is moved to its data entry position to store both the tree diameter and grade.

In a preferred and efficient data storage format, tree location and tree variety are stored in the memory storage cartridge in four bit word or four character lengths. After location and variety have been stored, the tree diameter and grade for each tree measured and inventoried is stored together in a single four bit word or four character length. Tree diameter and grade data for other trees of the same location and variety are stored in four bit words or four character lengths without requiring reentry or storing again of the tree location and variety information.

To enter a new location or a new variety while out in the field (for example), the RESET key is pressed causing the microcontroller operating code to execute a routine requesting first tree location and then tree variety. To select the desired location from a list of locations stored in the memory storage cartridge, the UP and DOWN keys are pressed as needed to scroll up or down the tree location list. The list is preferably shown in the display with a cursor next to the selected tree location. Once the desired tree location is selected, the data entry switch is moved to its data entry position to enter and store the selection.

After location has been entered, the operator is prompted to select tree variety. To select the desired tree variety from a list of varieties stored in the memory storage cartridge, the UP and DOWN keys are pressed as needed to scroll up or down the tree variety list. The tree variety list is also shown in the display with a cursor next to the selected tree variety. Once the desired tree variety is selected, the data entry switch is moved to its data entry position to enter and store the selection. Preferably, upon selection and entry of tree variety, both the tree variety and location are stored in the memory storage cartridge.

Both tree location and tree variety are preferably separated by a data delimiter to enable identification of location and variety when the data stored in the memory storage cartridge is processed. After storage of tree location and variety, all tree size and grade data for that location and variety are stored one after another sequentially and uninterrupted in the memory storage cartridge. When a change in either tree location or variety is made, preferably both tree variety and location are stored before additional trees are measured, graded and stored.

During measurement of tree diameter after location and variety data are entered and stored, a tree to be measured is graded and the diameter of the tree is measured. During measurement, the measurement apparatus is manipulated about the tree such that the tree is received between its caliper jaws. When received between the caliper jaws, the control handle is grasped and moved preferably toward the operator to close the jaws around the tree. When the tree engaging surface of each jaw bears against the tree, the operator moves the data entry switch to its data entry position causing both the selected tree grade and diameter, both shown in the display, to be stored in the memory of the memory storage cartridge.

During measurement, the grade and distance between the jaws is shown in real time on the display. To provide visual confirmation of the distance between the jaws there preferably is a scale or ruler affixed to the measurement head frame adjacent the jaws.

To download and process tree location, variety, grade and diameter information from a cartridge, an electrically conducting communications cable is connected between the communication port of the measurement apparatus and a communication port of a computer running software of this invention. To put the measurement apparatus into a mode after the communications cable has been connected, the RESET key of the measurement apparatus is pressed.

Thereafter, host tree data processing software operating on the personal computer can interact with the measurement apparatus to selectively cause tree data stored on the memory cartridge connected to the measurement apparatus to be downloaded to the computer where it can be stored, sorted, displayed, printed or otherwise manipulated.

The tree data processing software is also used to create a master tree location list and a master tree variety list. These lists are used to configure or set up a memory storage cartridge with selected tree location and tree variety list data for use out in the field. During configuration, portions of the master tree location list and master tree variety list are uploaded to a memory storage cartridge connected to the apparatus to prepare that cartridge for use in the field. The tree data processing software also can be used to erase the tree variety, location, diameter and grade location stored on a cartridge or to modify tree variety and location list data stored in the cartridge.

Objects, features and advantages of this invention are to provide a method and apparatus for measuring and storing tree related data which can be used to rapidly and efficiently store tree size, grade, location and variety data for large stands of up to at least several thousand trees; utilizes a user friendly data entry set up to speed data entry and storage; provides easy to follow visual prompts shown on its display to help guide an operator using the apparatus; is easily carried and supported by an operator of the apparatus; is an ergonomically user friendly design; is easily manipulated by an operator for enabling the caliper jaws and measurement head to be quickly and easily positioned relative to a tree that is about to be measured; stores tree data on a removable and portable memory storage cartridge that holds its data without requiring electrical power; uses a hollow frame that is light in weight and durable in construction for preventing operator fatigue; has a support handle, extension wand and measurement head constructed and arranged to allow tree diameter measurements to be made without requiring an operator to bend down or kneel on the ground during measurement; has a control handle construction which enables quick and easy movement of one or both caliper jaws to enable the jaws to quickly engage a tree being measured to speed measurement and data entry; and is an apparatus that is of economical manufacture and which is easy to assemble and simple to use.

BRIEF DESCRIPTION OF THE DRAWINGS

These and other objects, features, and advantages of this invention will become apparent from the following detailed description of the best mode, appended claims, and accompanying drawings in which:

FIG. 5 is a fragmentary side view of an adjustable bracket connecting the measurement head to the extension wand and a support leg for spacing the measurement head off of the ground;

FIG. 6 is cross sectional side view of the extension wand and measurement head;

FIG. 7 is a top sectional view of the measurement head;

FIG. 8 is a fragmentary front cross sectional view of a sensor pickup and vernier tape for enabling location of a movable jaw to be detected;

FIG. 9 is a cross sectional view of the extension wand taken along line 9—9 of FIG. 8 depicting a carriage for guiding movement of the control handle;

FIG. 10 is a cross sectional view of the extension wand taken along line 10—10 of FIG. 8 illustrating a guide coupling for locating the vernier tape relative to the sensor pickup while allowing relative movement therebetween;

FIG. 11 is an enlarged fragmentary front view of a pair of slot sensors of the pickup for sensing slots in the vernier tape;

DETAILED DESCRIPTION OF THE INVENTION

I. Introduction

Figure 1:
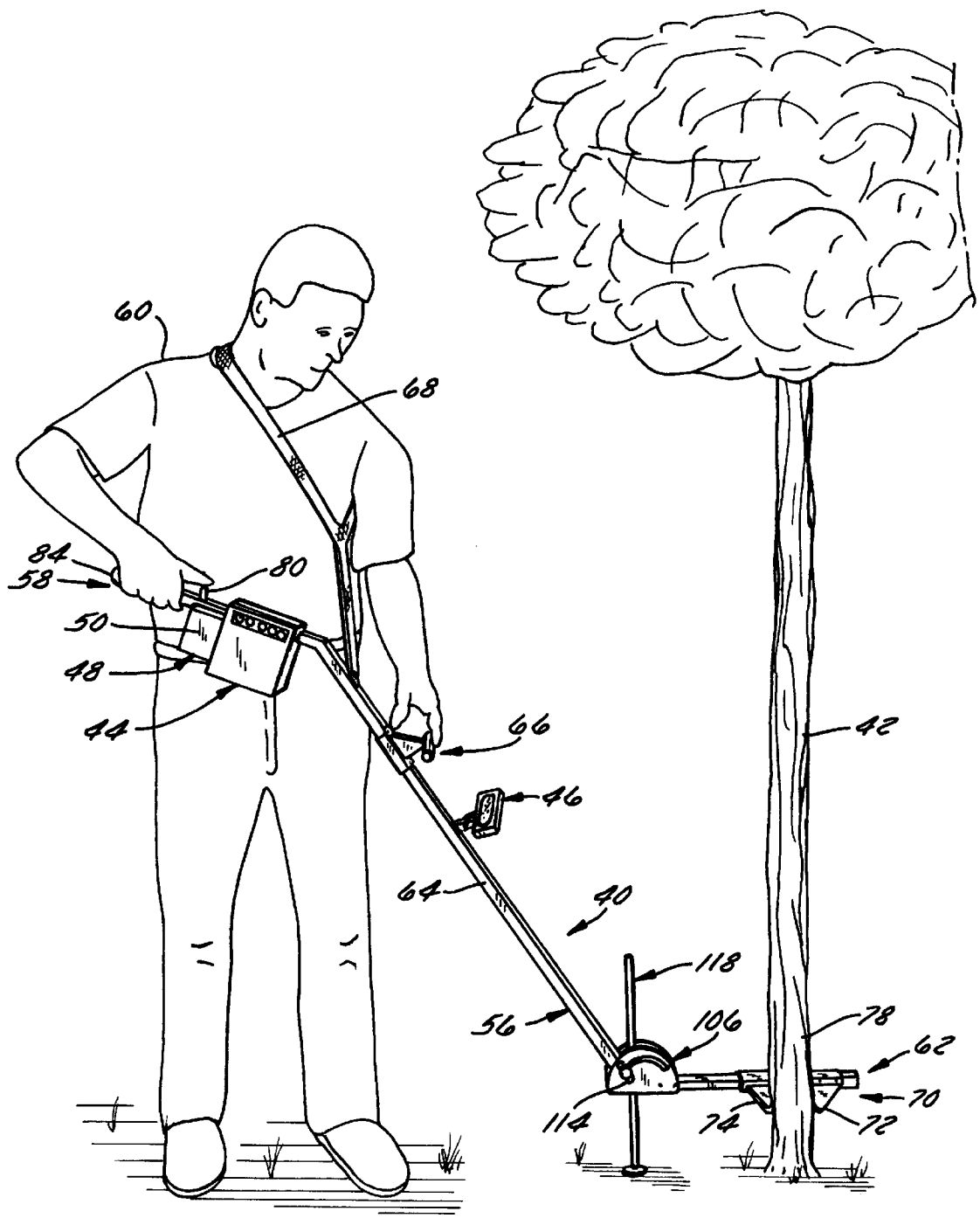
FIG. 1 is a perspective view of a human operator using a tree characteristic measurement apparatus of this invention to measure and record the diameter of a tree.

Referring to the drawings, FIG. 1 illustrates an apparatus 40 for measuring and preferably also recording a tree characteristic that preferably is a diameter of a tree 42. In addition to measuring and recording the diameter of a tree 42, the tree diameter measurement apparatus 40 of this invention preferably is also constructed and arranged to record other information for the particular tree 42 being measured, such as for example, the location of the tree 42, the type or variety of the tree 42, and the grade or quality of the tree 42.

To enable quick and easy measurement, viewing, and storage of the information, the apparatus 40 preferably has an on-board computer module 44, a display 46, and memory storage 48 that communicates with the computer 44 to store the measurements and other tree data. To provide flexible processing of the stored data, the memory storage 48 preferably is contained in a portable cartridge 50 that can be disconnected from the computer module 44 and removed so that different cartridges 50 can be used to help organize data recording and to enable cartridges 50 to be sent to a remote location where the data stored on a cartridge 50 can be processed.

Figure 12:
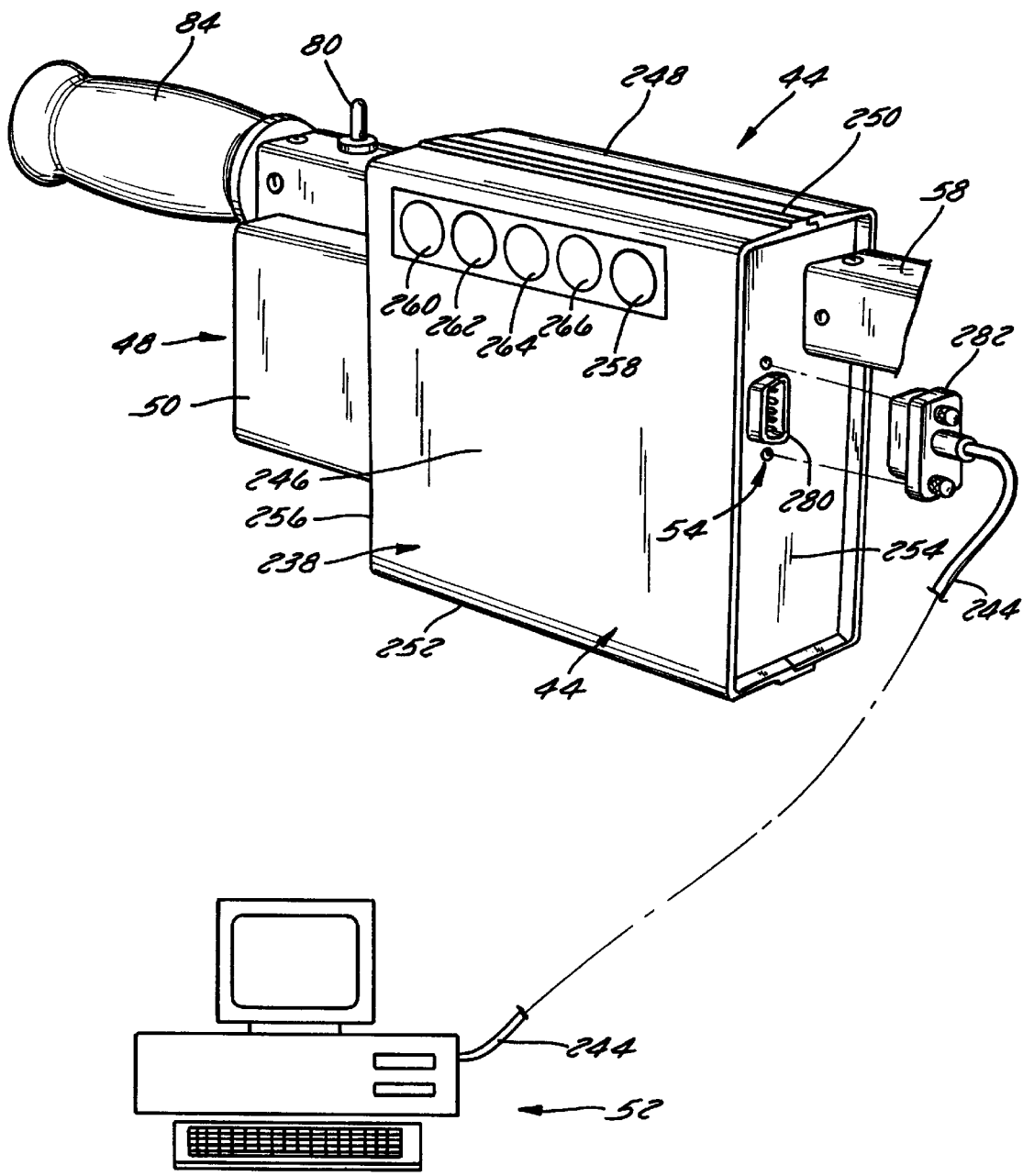
FIG. 12 is a perspective view of an on-board computer module carried by the frame of the measurement apparatus having a communications port connected by a cable to a personal computer.

To enable the data stored in memory 48 to be downloaded to another computer (FIG. 12) that preferably is a personal computer 52, the on-board computer module 44 has a communications port 54 (FIG. 12). When downloaded into a personal computer 52, a software program, such as the program presented in Appendix B, a database, a spreadsheet, a word processor, or another software program preferably can be used to process the data preferably for use in compiling an inventory of the trees measured.

II. Mechanical Components

As is shown in FIGS. 1–9, the tree diameter measurement apparatus 40 has an elongate frame 56, with a support handle 58 at one end that is grasped by an operator 60, a measurement head 62 at the other end for facilitating measurement of tree diameter, and an extension wand 64 connecting the support handle 56 to the measurement head 62 for enabling an operator 60 to quickly and easily use the apparatus 40 while standing up and holding the apparatus 40. To help maneuver, guide and support the measurement apparatus 40, there preferably also is a control handle 66 that is spaced from the support handle 58. Preferably, the control handle 66 is carried by the extension wand 64, but it can be carried by or adjacent the support handle 58. To help transfer a substantial part of the weight of the measurement apparatus 40 to the operator 60, the apparatus 40 preferably has a shoulder strap 68 worn about the shoulder of the operator 40 that is attached to the wand 64 but can also be attached to the support handle 58.

To measure the diameter of a tree 42, the measurement head 62 has a caliper 70 having a pair of jaws 72 & 74 with at least one of the jaws being movable relative to the other of the jaws. Preferably, the caliper 70 has a fixed jaw 72 and a movable jaw 74 with the control handle 66 operably connected to the movable jaw 74 to enable the movable jaw 74 to be controllably moved by the operator 60 toward and away from the fixed jaw 72. During operation, a sensor 76 (FIG. 2 & 3) in communication with both the movable jaw 74 and the computer 44 senses the position of the movable jaw 74 so that the distance between jaws can be determined 72 & 74. Preferably, the sensor 76 and computer 44 are calibrated so that once the position of the movable jaw 74 is known, its position relative to the fixed jaw 72 can be determined for enabling the distance between the two jaws 72 & 74 to be determined. During operation, the distance between caliper jaws 72 & 74 is preferably determined by the computer 44 and shown on the display 46.

When measuring diameter, the measurement apparatus 40 is positioned such that at least a portion of a standing tree or fallen log is received between the caliper jaws 72 & 74. Preferably, as is shown in FIG. 1, a portion of the tree 42 adjacent its base, such as its trunk 78, is received between the jaws 72 & 74, which preferably are spaced sufficiently far enough apart from each other to receive the tree 42. Thereafter, the control handle 66 is moved to reduce the distance between the jaws 72 & 74 until both jaws 72 & 74 bear against the exterior of the tree 42. When both jaws 72 & 74 bear against the exterior of the tree 42, such as is depicted in FIG. 1, a value representing the distance between the jaws 72 & 74, which is preferably shown in the display 46, can preferably be selectively stored in memory 48. Preferably, this distance is about the same as the diameter of the tree 42 at the location of the tree 42 being measured and can be selectively recorded into memory 48 by the operator 42 pressing a button, key or switch 80 that is in communication with the computer 44.

A. Frame

Figure 2:
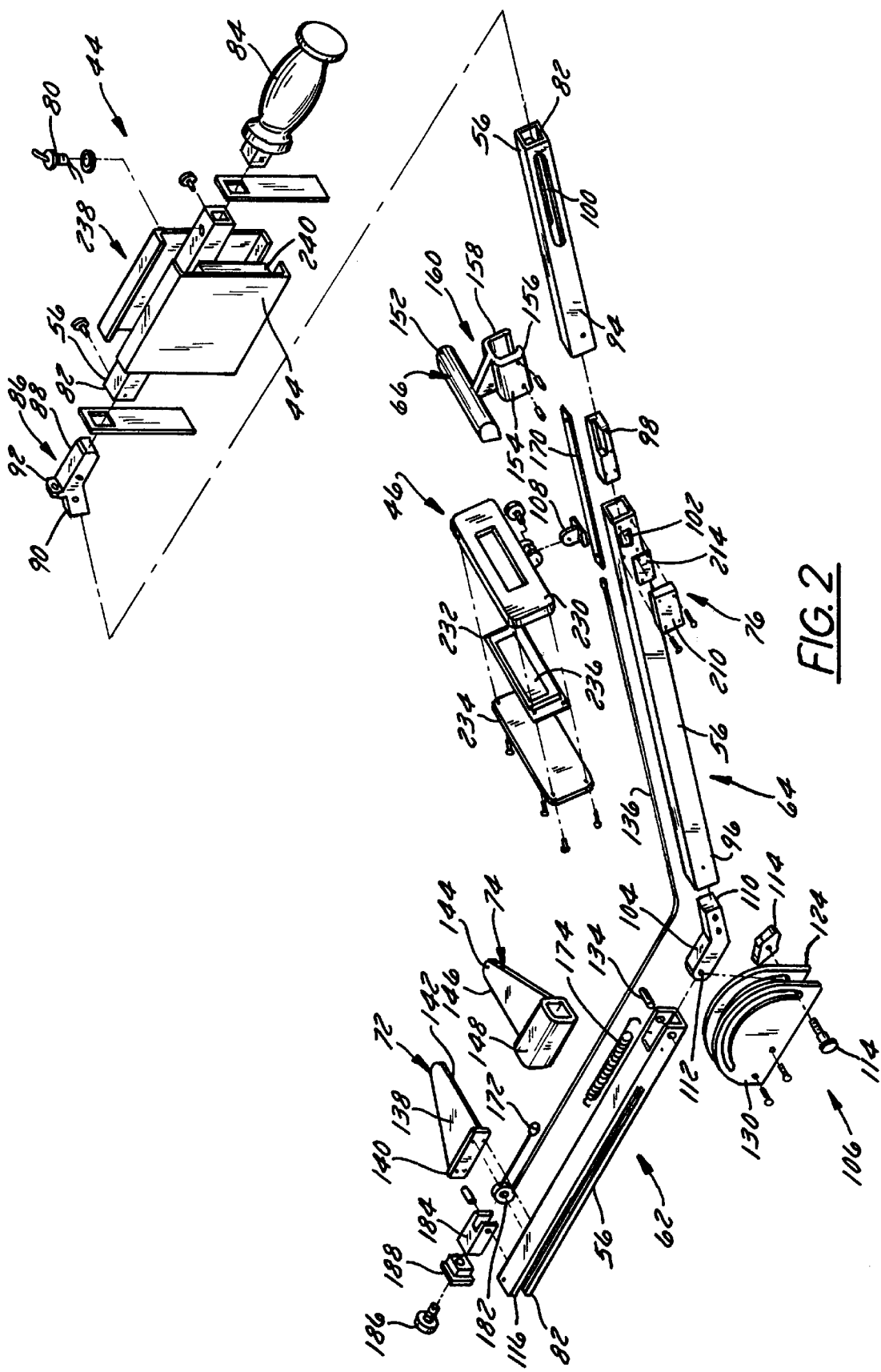
FIG. 2 is an exploded view of the tree characteristic measurement apparatus of this invention.

Referring additionally to FIG. 2, the frame 56 consists of the support handle 58, the extension wand 64 and the measurement head 62. As is shown more clearly in FIG. 2, the frame 56 portion of each of these components consists of an elongate tubular member 82 that preferably is hollow for enabling mechanical and electrical components, such as preferably cabling, to be received therein.

Preferably, each tubular member 82 of the frame 56 is constructed of a metal, such as steel, iron, titanium, magnesium, aluminum, an alloy of any of these materials, or another suitable metal material. Alternatively, one or more of the tubular members 82 of the frame 56 can be constructed of plastic, a composite, a ceramic, or another non-metallic material.

In a preferred embodiment, as is shown in FIG. 2, each tubular frame member 82 is of generally rectangular or square cross section. Preferably, each tubular member is constructed of extruded aluminum one inch square tubing having a generally square cross section and a sidewall thickness of at least about one-sixteenth inch. Alternatively, one or more of the tubular frame members 82 can be of round cross section or can be constructed to have another cross sectional shape.

The support handle 58 has a handle grip 84 attached to one end of a tubular support handle member 82 that preferably is hollow, but can be solid if desired. The computer module 44 is carried by the frame 56. As is shown in FIGS. 1 & 2, the computer module 44 preferably is carried by the tubular member 82 of the support handle 58 and is located adjacent the handle grip 84 to enable convenient access to the computer module 44 by the operator 60. Alternatively, the computer module 44 can be attached to or carried by the wand 64. Wiring or cabling from the computer module 44 preferably runs within the hollow of the tubular frame 56 to the sensor 76 and display 46.

The support handle 58 is connected to the wand 64 by an obtusely angled connector elbow 86 to help ergonomically position the support handle 58 and grip 84 relative to the wand 64 and measurement head 62 to facilitate comfortable use by an operator 60. As is shown in FIG. 2, the elbow 86 has a first mounting stem 88 and a second mounting stem 90 obtusely angled relative to the first stem 88. Preferably, the elbow 86 provides an obtuse included angle between the support handle 58 and extension wand 64 of between about 115° and about 140°. Preferably, the elbow 86 has an angle of between about 125° and about 130° to provide an ergonomic and user friendly design for easy use and simple maneuvering by operators of different shapes, sizes and heights.

To enable a shoulder strap 68 to be attached to the measurement apparatus 40, the elbow 86 preferably has an outwardly extending eye 92. Alternatively, the strap 68 can be mounted directly to the wand 64, such as is shown in FIG. 1, or to the support handle 58.

In assembly, one stem 88 of the elbow 86 is telescopically received in a hollow of the support handle 58 and the other stem 90 of the elbow 90 is telescopically received in another hollow of the extension wand 64. To secure the elbow 90 to each component, the elbow 90 has transversely oriented through-holes which are complementary with through-holes in each tubular component for receiving fasteners, that preferably are pins, screws, bolts or the like, when assembled. Where pins are used, the pins and through-holes are preferably sized to produce a friction fit or an interference fit to securely attach the elbow 86 to a tubular frame component.

The extension wand 64 is preferably of two piece construction having a first wand section 94 attached to the connector elbow 86 and a second section 96 attached to the first portion 94 by a guide coupling 98. The guide coupling 98 preferably is straight, but can be curved or bent if desired.

The first wand section 94 preferably has a mounting slot 100 for receiving the control handle 66. To permit the control handle 66 to be moved relative to the wand 64, the mounting slot 100 preferably is elongate. So that the control handle 66 can be operably connected to the movable jaw 74 of the caliper 70, the mounting slot 100 is in communication with the hollow of the wand 64.

The second section 96 of the wand 64 has an opening 102 for mounting the sensor 76 adjacent the guide coupling 98. The second section 96 is attached to the measurement head 62 by a mounting elbow 104 and an adjustable bracket 106. Preferably, the display 46 is mounted to the second wand section 96 by another bracket 108 and fasteners, such as screws or the like.

The mounting elbow 104 preferably is also obtusely angled for enabling the measurement head 62 to be obtusely offset relative to the wand 64. The mounting elbow 104 has a first mounting stem 110 that is obtusely angled relative to a second mounting stem 112. The first mounting stem 110 is telescopically received in a hollow portion of the wand 64 and is secured to the wand 64 by one or more fasteners. The first stem 110 of the mounting elbow 104 is preferably secured to the wand 64 by a fastener 114 of the adjustable bracket, such as the bolt and thumb nut shown in FIG. 2. If desired, another fastener, such as a pin or a screw, can be used to secure the elbow 104 to the wand 64.

The elbow 86 & 104 and guide coupling 98 are constructed of a strong and resilient material capable of withstanding bending moments and stresses encountered during use of the measurement apparatus 40. Preferably, each of these components have a core constructed of polyurethane or another similarly durable material and can have outer reinforcing plates constructed of a metal, such as steel, titanium, magnesium, aluminum or an alloy thereof. Alternatively, if desired, the connecting components can be partially or completely constructed of metal, a thermoset, a thermoplastic, a nylon, a ceramic, a composite, or another suitably strong material. Preferably, the guide coupling 98 is constructed of a plastic or a similar material and has no reinforcing plates.

The measurement head 62 is secured to the other stem 112 of the mounting elbow 104 by a single pin or another fastener that permits the head 62 to pivot. The measurement head 62 preferably is of tubular construction and has a slot 116 for receiving and guiding the movable jaw 74 as it travels along the measurement head 62. The fixed jaw 72 is mounted to the measurement head 62 by fasteners, such as screws that preferably are sheet metal screws or another type of fastener. As is shown in FIG. 2, the fixed jaw 72 preferably is secured to the measurement head 62 by four sheet metal screws.

Preferably, the fixed jaw 72 is mounted to the measurement head 62 adjacent the free end of the measurement head 62. Preferably, the movable jaw 74 is carried by the measurement head 62 and is located between the fixed jaw 72 and the extension wand 64. During operation, the movable jaw 74 can be moved toward or away from the fixed jaw 72 to measure the diameter of a tree 42 that is located between the jaws 72 & 74. Together, the measurement head 62, fixed jaw 72, and movable jaw 74 form a caliper 70 for approximating and preferably relatively accurately measuring the diameter of a tree 42 located between its jaws 72 & 74. Alternatively, if desired, the movable jaw 74 can be located adjacent the free end of the measurement head 62 with the fixed jaw 72 being located between the movable jaw 74 and extension wand 64.

Preferably, the extension wand 64 is at least about twenty inches long so that an operator can use the apparatus while standing up. In a preferred embodiment of the measurement apparatus 40 of this invention, the measurement head 62 is approximately fifteen to about sixteen inches long, the wand 64 is approximately thirty six to about thirty eight inches long, and the support handle 58 is approximately fourteen to about fifteen inches long including the length of the handle grip 84. Preferably, the measurement head 62 is at least about fourteen inches long for enabling the jaws 72 & 74 to be spaced sufficiently far enough apart to measure trees up to six inches in diameter for use in inventorying planted tree stocks of a nursery. For inventorying lumber, the measurement head 62 preferably can be longer for enabling larger diameter trees to be measured. For example, the measurement head 62 can be made as large as eighteen inches or longer to enable measurement of trees having a diameter of up to at least about twelve inches.

B. Extension Support Leg

Figure 4:
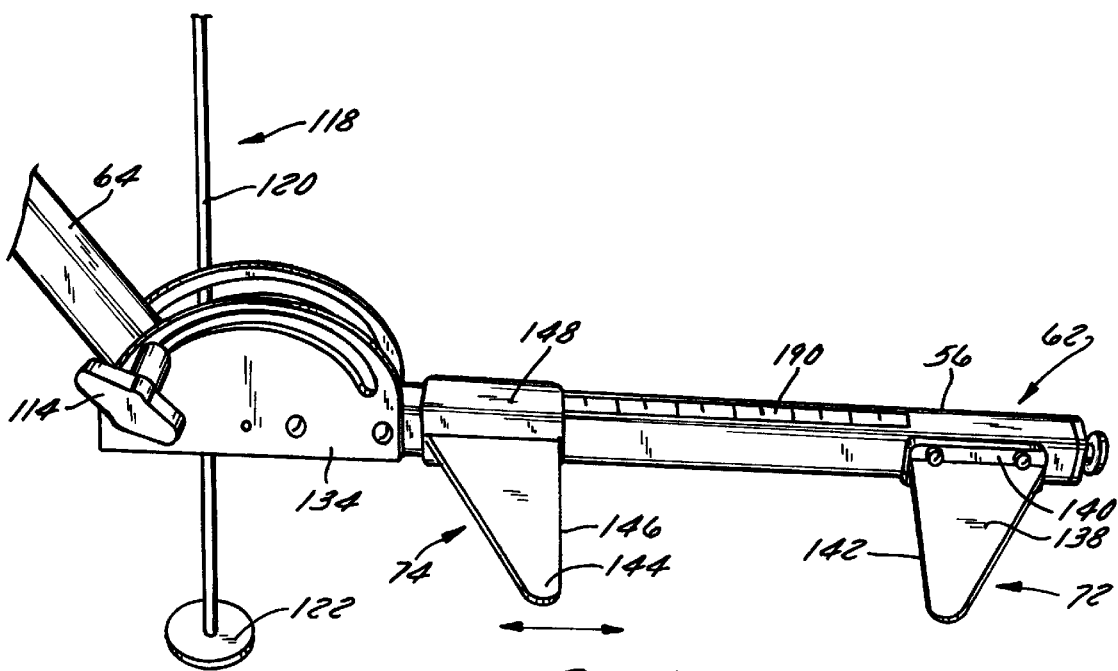
FIG. 4 is a fragmentary perspective view of a measurement head of the apparatus for measuring the diameter of a tree.

To position the jaws 72 & 74 above the ground to help ensure that an accurate diameter measurement is taken, the measurement head 62 is carried by an extension support leg 118, such as in the manner shown in FIGS. 4 & 5. The extension support leg 118 preferably is an elongate rod 120 that has a support pad 122 at one end and which is adjustably secured to one of the plates 124 of the adjustable bracket 106. To enable the leg 118 to be secured to the bracket plate 124, the plate 124 has a ferrule 126 for telescopically receiving the rod 120 of the support leg 118. The ferrule 126 has a threaded opening for receiving a screw, that preferably is a thumb screw 128 which bears against the rod 120 to hold the leg 118 in place.

In operation of the leg 118, the screw 128 is loosened to allow the leg 118 to be moved relative to the ferrule 126 and measurement head 62 so that the caliper jaws 72 & 74 will be spaced a desired distance from the ground during operation of the measurement apparatus 40. After setting the distance that the leg 118 extends from the ferrule, the screw 128 is tightened preferably until its end bears relatively tightly against the rod 120 of the leg 118 thereby securely holding the leg 118 in the desired position.

Thereafter, the measurement apparatus 40 can be used in the manner depicted in FIG. 1, with the support leg 118 bearing against the ground thereby spacing the caliper jaws 72 & 74 a distance from the ground. In this manner, consistency of tree diameter measurement preferably is maintained by making sure the caliper jaws 72 & 74 are spaced about the same distance above the ground for each tree measured.

Preferably, the support leg 118 spaces the jaws 72 & 74 at least a few inches from the ground. For example, the leg 118 can be adjustably positioned to allow the measurement head 62 to almost contact the ground during measurement and can be adjusted to space the jaws 72 & 74 as many as approximately fifteen to about sixteen inches above the ground. In a preferred embodiment, the leg 118 is at least about fourteen inches in length and preferably is about sixteen inches in length.

C. Measurement Head Adjustment

To enable the angle of the measurement head 62 to be adjusted relative to the extension wand 64, the adjustable bracket 106 and mounting elbow 104 operably connect the measurement head 62 to the extension wand 64. The adjustable bracket 106 comprises a pair of plates 124 & 130, with one of the plates being located on one side of the measurement head 62 and the other of the plates being located on the other side of the head 62. As is shown in FIG. 2, each plate 124 & 130 is affixed to the tubular frame of the measurement head 62 by at least two fasteners, both of which preferably are sheet metal screws.

Each plate 124 & 130 has an arcuate adjustment slot 132 which receives the shank of bolt 114 and which enables the position of the measurement head 62 relative to the wand 64 to be adjusted. In operation of the adjustable bracket 106, the thumb nut 114 is loosened to allow both bracket plates 124 & 130 to move relative to the wand 64. Thereafter, the head 62 is pivoted toward or away from the wand 64 and pivots about the mounting elbow 104 and pin 134 until the desired position is reached. When the desired position is reached, the thumb nut 114 is tightened causing both bracket plates 124 & 130 to tightly frictionally bear against the exterior of the extension wand 64 for preventing further relative movement between the measurement head 62 and wand 64.

Preferably, the position of the measurement head 62 is adjustable throughout approximately no more than about 180° range of motion. If desired, the measurement head 62, elbow 104, wand 64, and bracket 106 can be constructed and arranged to allow a lesser or a greater range of adjustment. In a preferred embodiment, the position of the head 62 can be adjusted in one direction until its longitudinal axis is substantially parallel to the support handle 58. In the other direction, the measurement head 62 can be pivoted toward the wand 64 until it is adjacent to and preferably substantially bears against the tubular frame of the wand 64, such as is depicted in phantom in FIG. 6.

During use, this range of adjustment facilitates an operator 60 being able to customize setup of the measurement apparatus 40 to make it convenient and quick to use and move. For example, this range of adjustment allows an operator 60 to set the angle of the measurement head 62 relative to the wand 64 such that the distance between rows of trees can be accommodated. For example, if the distance between rows of trees is shorter, it may be desirable to reduce the angle between the head 62 and the wand 64. Conversely, the angle can be increased where the tree rows are spaced further apart from each other. Additionally, the angle between the head 62 and wand 64 is also adjustable to help accommodate users of various sizes, shapes and heights. Additionally, when finished using the measurement apparatus 40, the head 62 can advantageously be folded against the wand 64 to make the apparatus 40 more compact for storage.

D. Caliper Assembly

As is shown in FIGS. 2 and 6–11, the caliper assembly 70 consists of the fixed jaw 72, the movable jaw 74, at least a portion of the extension wand 64, the measurement head 62, the control handle 66 and a flexible member 136 connecting the control handle 66 to the movable jaw 74 so that the movable jaw 74 can be moved. Preferably, the caliper 70 is constructed such that at least one of the jaws can be moved from an open position, allowing a tree 42 to be placed between the jaws 72 & 74, toward a closed position, where a portion of each jaw bears against part of the tree 42 to enable a measurement of tree diameter to be made.

As is shown in FIG. 4, the fixed jaw 72 has a fin 138 generally outwardly extending from a base 140 with the fin 138 having a tree engaging surface 142 facing toward the movable jaw. The base 140 of the fixed jaw 72 is affixed to the frame 56 of the measurement head 64 by at least two fasteners and preferably is attached to the measurement by four spaced apart screws, that can be sheet metal screws.

The movable jaw 74 also has a fin 144 outwardly extending from a base 146 with the fin 144 having a tree engaging surface 146 facing toward the tree engaging surface 146 of the fixed jaw 74. The base 148 of the movable jaw 74 is a sleeve of generally square or rectangular cross section that is preferably substantially complementary with the frame of the measurement head 62 for being slidably guided in movement over the measurement head frame. To further help guide movement of the movable jaw 74, the base 148 has an inturned tab 150 (FIG. 6) that is received in measurement head frame sidewall slot 116. Preferably, the flexible member 136 is operably connected to the tab 150 for enabling the jaw fin 144 to move in response to the control handle 66 being moved.

The flexible member 136 preferably is a resilient and flexible cable, such as a woven steel cable, a nylon cable, a Kevlar cable or the like. Alternatively, the flexible member 136 can be a belt, a wire, a flexible bend or another suitable connector that is flexible.

Preferably, the control handle 66, measurement head 62, cable 136 and movable jaw 74 are constructed and arranged such that movement of the control handle 66 moves jaw 74. Preferably, movement of the control handle 66 in one direction moves the movable jaw 74 towards the fixed jaw 72 and movement of the handle 66 in the other direction moves the movable jaw 74 away from the fixed jaw 72. Preferably, the caliper 70 is constructed such that the movable jaw 74 moves substantially in unison with movement of the control handle 66.

Referring to FIG. 2, to enable the control handle 66 to be carried by the extension wand 64, the control handle 66 has a preferably T-shaped handle grip 152 that is attached to a base 154 having a pair of spaced apart arms 156 & 158 forming a generally U-shaped inverted saddle 160 that rides along the frame 56 of the extension wand 64 adjacent the control handle guide slot 100 during operation. Referring to FIGS. 2, 8 & 9, to help guide the control handle 66 along the slot 100, a carriage 162 (FIGS. 8 & 9) is received within the hollow in the extension wand 64 adjacent the slot 100 and is attached to the control handle arms 156 & 158 by fasteners 164 that preferably are screws or the like.

The carriage 162 has a body 166 with two pairs of spaced apart rollers or wheels 168 secured to the body 166 which bear against an interior surface of the hollow wand frame for enabling the control handle 66 to be relatively smoothly moved substantially along the entire length of the guide slot 100. Two spaced apart and elongate bolts 164 secure both control handle arms 156 & 158 to the body 166 of the carriage 162. Preferably, each bolt 164 also functions as an axle upon which a pair of carriage rollers or wheels 168 are journalled. Although each roller or wheel 168 preferably can rotate during movement of the control handle 66, the carriage rollers or wheels 168 can be fixed, if desired.

As is depicted more clearly in FIGS. 2 & 6, the cable 136 is received within the hollow portion of the extension wand frame and the hollow portion of the tubular measurement head frame. One end of the cable 136 is preferably operably connected to the control handle 66 and the other end of the cable 136 is operably connected to the movable jaw 74. In a preferred embodiment of the measurement apparatus 40, one end of the cable is connected to the control handle 66 by a sensor vernier reader tape 170 and the other end of the cable 136 is connected directly to the movable jaw 74. However, if desired, the cable 136 can be connected directly to the control handle 66 with the sensor vernier 170 being carried by any one of the control handle 66, movable jaw 74 or the cable 136.

Referring to FIGS. 2 & 6, the cable 136 is operably attached to movable jaw tab 150. The tab 150 has a through-opening for receiving the cable 136. The cable 136 has a head 172 crimped to its free end. The head 172 is received in the tab through-opening and has an eyelet for receiving a biasing element 174. When assembled, the biasing element 174 not only urges the movable jaw 74 preferably toward an open position but also helps to maintain the cable 136 in tension to help ensure measurement accuracy. Alternatively, if desired, the biasing element 174 can be attached directly to the tab 150 or another portion of the movable jaw 74.

Preferably, the cable head 172 has a portion on one side of the movable jaw tab 150 that is larger than the tab through-opening, a second portion which is small enough to be received in the through-opening, and another portion on the other side of the tab 150 that is larger than the tab through-opening so that movement of the control handle 66 translates into movement of the movable jaw 74. Preferably, the tab 150 and cable head 172 are constructed so that there is very little play so that movement of the control handle 66 translates into substantially simultaneous movement of the movable jaw 74.

Referring to FIG. 8, the sensor vernier 170 is attached at one end to the control handle carriage body 166 and at its other end to the cable 136. The sensor vernier 170 preferably is a generally flat tape-shaped member having a hole 176 adjacent one end for receiving a cap 172 at the end of the cable 136 to secure the cable 136 to the vernier 170. As is depicted more clearly in FIG. 9, to enable the vernier 170 to be attached to the control handle 66, the carriage body 166 has a channel at one end for receiving an end of the vernier 170. To attach the vernier 170 to the control handle carriage 162, the vernier 170 and carriage body 166 have bores which are generally coaxially aligned for receiving a screw 180, a pin or another fastener. With one end of the vernier 170 mounted to the carriage body 166, the vernier 170 preferably is thereby operably connected to the control handle 66.

Figure 3:
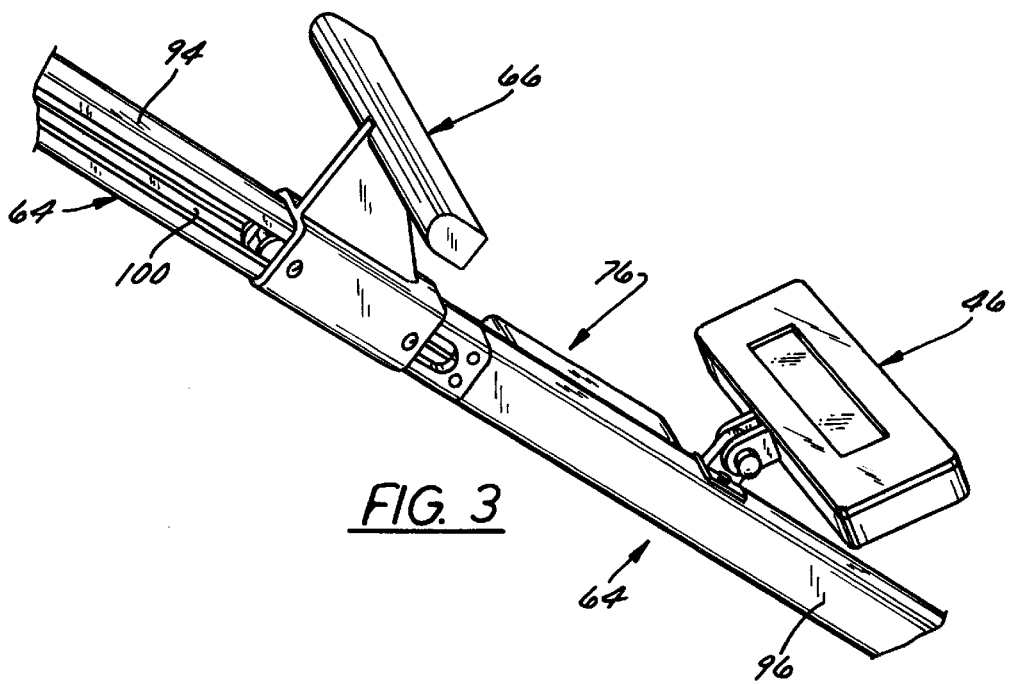
FIG. 3 is a fragmentary perspective view of a portion of an extension wand of the tree characteristic measurement apparatus depicting a control handle for controlling operation of a measurement head of the apparatus and a display for displaying tree information.

As is depicted in FIG. 3, the caliper assembly 70 is preferably constructed and arranged such that the movable jaw 74 moves toward the fixed jaw 72 when the control handle 66 is moved toward the support handle 58. Alternatively, the caliper 70 can be constructed and arranged to move the movable jaw 74 away from the fixed jaw 72 when the control handle 66 is moved toward the support handle 58.

As is shown in FIGS. 2 & 6, in a preferred caliper embodiment, the cable 136 extends from adjacent the control handle 66, passes under the mounting elbow 104 and is looped around a return pulley 182 adjacent the free end of the measurement head 62 before being attached to the movable jaw 74 spaced a distance from the free end of the measurement head 62. To help achieve smooth cable movement during operation, the mounting elbow 104 or tubular frame 56 of the measurement head 62 preferably have a cable passage or clearance groove to provide sufficient cable routing clearance between the tubular frame sidewall and the exterior of the elbow 104. To further assist cable movement, the cable 136 is preferably received around a portion of a second pulley (not shown) that can be movable or fixed and which is carried by the mounting elbow 104 adjacent the end of the extension wand 64.

The return pulley 182 is operably affixed to the measurement head frame adjacent its free end. The pulley 182 is carried by a block 184 that is attached by a fastener 186 to a plug 188 that is telescopically received in the free end of the frame 56 of the measurement head 62. As is shown more clearly in FIG. 2, the block 184 has a pair of spaced apart arms for receiving the return pulley 182 therebetween and also has a pin about which pulley is journalled and mounted to the block 184. Tension from the biasing element 174 helps pull the plug 188 and block 184 toward the wand 64 keeping the plug 188 telescopically nested in the end of the measurement head 62. If desired, the plug 188 can be friction fit into the end of the measurement head frame or it can be secured to the head 62 in another manner, such as by an adhesive, a fastener or by another method.

The fastener 186 preferably is a thumb screw 186 that is threadably received by the block 184 for positioning the block 184 relative to the plug 188 to calibrate the spacing of the jaws 72 & 74 so that accurate measurements are obtained during operation. Preferably, the thumb screw 186 is rotated until the spacing between the jaws 72 & 74, as shown by a scale 190 (FIG. 4) attached to the measurement head 62, relatively closely matches the tree diameter measurement shown in the display 46.

Preferably, the movable jaw 74 is biased toward its fully open position, such as is depicted in FIGS. 4 & 6 by biasing element 174. Biasing element 174 is a resilient elastic member that preferably is a tension coil spring 174. To bias the movable jaw 74 toward its fully open position, the spring 174 is attached to a portion of the movable jaw 74 at one end and is attached to the pivot pin 134 connecting the mounting elbow 104 to the tubular frame 56 of the measurement head 62. The spring 174 also helps keep the cable 136 taut during operation to help ensure accurate tree diameter measurement.

III. Tree Diameter Measurement

Figures 7, 11:
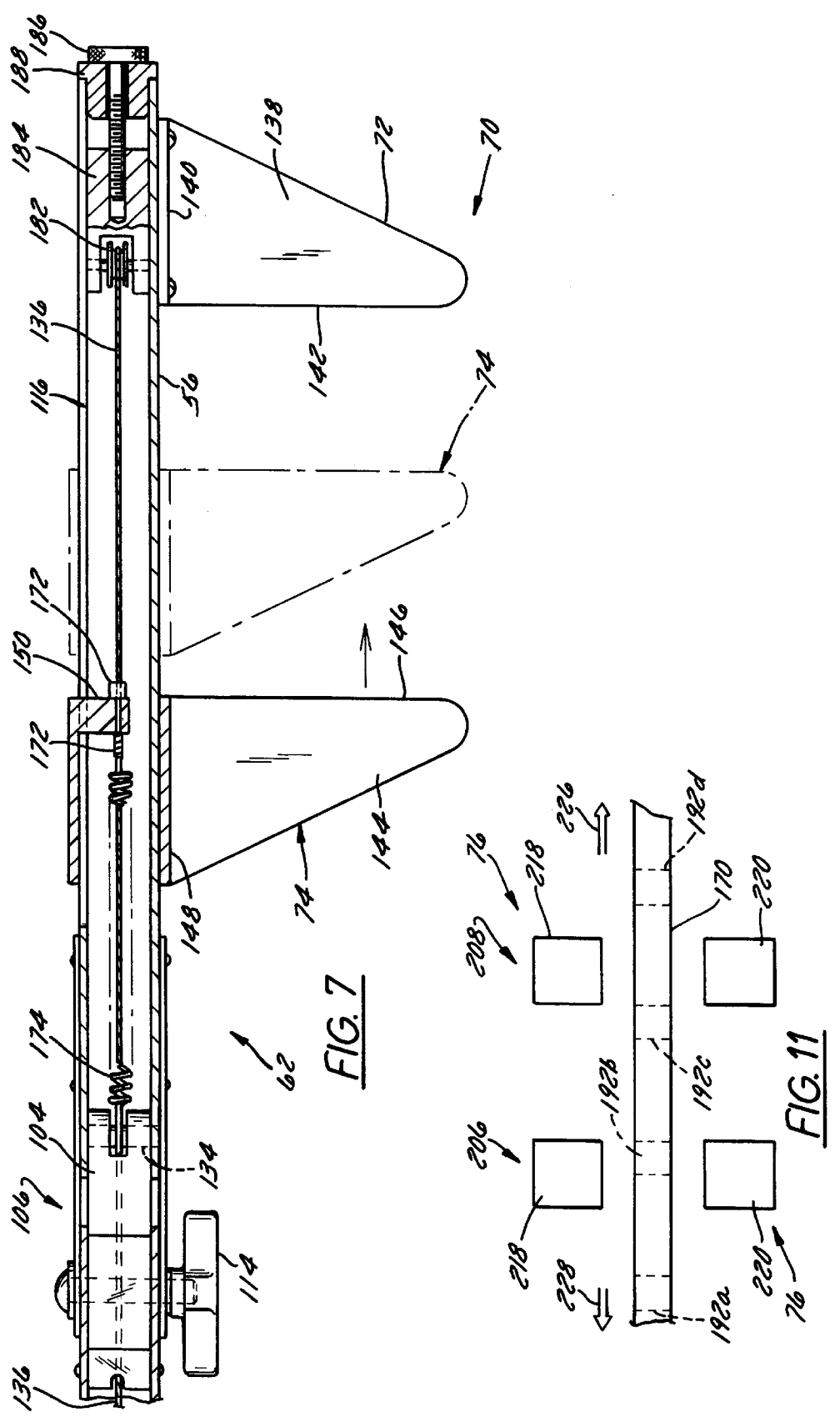

Referring to FIGS. 8, 10 & 11, to measure or approximate tree diameter, the sensor 76 communicates with the sensor vernier 170 and the computer 44 for determining the distance between the tree engaging surfaces 142 & 146 of the movable and fixed jaws 72 & 74. To enable measurement of the distance between the jaws 72 & 74, the vernier 170 has a plurality of spaced apart measurement locators 190 which are read by the sensor 76 to allow the location of the movable jaw 74 relative to the fixed jaw 72 to be determined. The vernier 170 also has at least one home/start or reference position locator 194 for enabling a known reference position of the vernier 170 and the movable jaw 74 to be determined.

During operation, the sensor 76 reads the vernier 170 and communicates with the computer 44 so that the computer 44 can determine the distance between the jaws 72 & 74 and hence determine the diameter of a tree located between the jaws 72 & 74. The distance between the tree engaging surfaces 142 & 146 of the jaws 72 & 74 preferably is displayed by the computer 44 on the display 46. To provide confirmation of the relative accuracy of the measurement shown in the display 46, the frame 56 of the measurement head 62 preferably has a scale or ruler 190 (FIG. 4) adjacent the jaws 72 & 74 and within view of the operator 60 for enabling the operator 60 to visually approximate the distance between the tree engaging surfaces 142 & 146 of the jaws 72 & 74.

The locators 192 & 194 of the vernier 170 are preferably spaced apart through-bores or slots in the tape-like vernier 170 which are read, sensed or detected by the sensor 76 during operation. Preferably, the vernier 170 has a first array of measurement locator slots 192 that are spaced apart by a first distance and a home/start position slot 194 that is spaced apart from an adjacent measurement locator slot 192 by a second distance that is not equal to the first distance. Preferably, the measurement locator slot spacing distance is the same as an incremental unit of measurement for the measurement apparatus 49.

For example, in a preferred embodiment, each pair of adjacent measurement locator slots 192 are spaced apart from each other by a distance, d, of about 0.25 inches. In a preferred embodiment of the measurement apparatus 40, this measurement locator slot spacing enables the distance between the tree engaging surfaces 142 & 146 of the jaws 72 & 74 to be measured in approximately 0.25 inch increments. Alternatively, the spacing of adjacent pairs of measurement locator slots 192 can be increased or decreased depending upon the accuracy of measurement desired. For example, the distance between adjacent measurement locator slots 192 can be reduced to 0.125 inches, or less, if it is desired to be able to measure the distance between the jaws 72 & 74 in 0.125 inch, or smaller, increments.

The vernier 170 is a tape preferably constructed of a relatively stiff and resilient material that is able to be accurately read by the sensor 76. Alternatively, the vernier tape 170 can be made of a more flexible material, so long as the portion of the tape 170 being read by the sensor 76 is accurately located relative to the sensor 76.

In a preferred vernier tape embodiment, the vernier tape 170 is constructed of a generally flat stainless steel strip that is relatively thin and which has a thickness, for example, preferably of about 0.020 inches. Preferably, each pair of adjacent measurement locator slots 192 are spaced apart from each other by about 0.25 inches. Each measurement locator slot 192 and home/start position slot 194 preferably has a lengthwise dimension of about 0.15 inches and a widthwise dimension of about 0.10 inches. Preferably, the outer edges of each of the locator slots 192 & 194 are generally aligned and spaced a fixed distance of, for example, of about 0.035 to about 0.050 inches from an edge of the tape 170. Each of the slots 192 & 194 are preferably spaced about the same distance for the tape edge. Alternatively, the construction and dimensions of these slots 192 & 194 can vary from the preferred embodiment and still be suitable for use performing tree diameter measurement.

The home/start position slot 194, shown in phantom in FIG. 8, preferably is located adjacent or at one end of the array of measurement locator slots 192 and is spaced a second fixed distance away from the nearest measurement locator slot 192. If desired, the distance between the reference position slot 194 and an adjacent measurement locator slot 192 can be greater than or less than, but not equal to, d, the measurement locator slot spacing distance. Preferably, as is depicted in FIG. 8, the home/start position slot 194 is spaced a distance, s, that is about 0.35 inches from the nearest measurement locator slot 192.

As is shown in FIG. 10, the vernier tape 170 is received in a guide slot 196 in the guide coupling 98 for accurately positioning the tape 170 relative to the sensor 76. The guide coupling 98 is received within the hollow extension wand 66 and has a pocket 198 that provides clearance for the sensor 76 and which enables the slots 192 & 194 of the vernier tape 170 to be relatively accurately located relative to the sensor 76 during operation. The guide coupling 98 preferably also has a conduit hollow 200 for allowing passage of electrical wiring or cabling which runs from the computer 44 to the sensor 76 and/or display 46.

The sensor 76 preferably comprises a pickup or module 214 (FIG. 2) having a base 202 which carries three slot sensors 204, 206 & 208 that communicate with the computer 44 to indicate to the computer 44 when a slot 192 or 194 has passed by a particular slot sensor. As is shown in FIGS. 6 & 8, the slot sensors 204, 206 & 208 extend into the hollow portion of the wand 64 through hole 102 (FIG. 2) in the sidewall of the frame 56 of the wand 64. The slot sensors 204, 206 & 208 are protected by a cover 210 that is secured to the wand 64 by a pair of fasteners 212 that preferably are screws, bolts or the like. To help urge the slot sensors 204, 206 & 208 toward the coupling 98 and vernier 170, there preferably is a pad 216 between the sensor base 202 and the cover 210. Although the pad 216 can be constructed of a solid and stiff material, the pad 216 preferably is constructed of a resilient fabric or another non-metallic material.

As is shown in FIGS. 10 & 11, each slot sensor 204, 206 & 208 has an upper arm 218 and a lower arm 220 between which the vernier tape 170 is located during operation. As is also illustrated by FIG. 10, when the tape 170 is received in the guide slot 196 of the coupling 98, adjacent locator slots 192 and/or 194 are positioned generally in between the upper and lower arms 218 & 220 of a slot sensor such that an adjacent slot can be properly sensed by the sensor.

Figure 15:
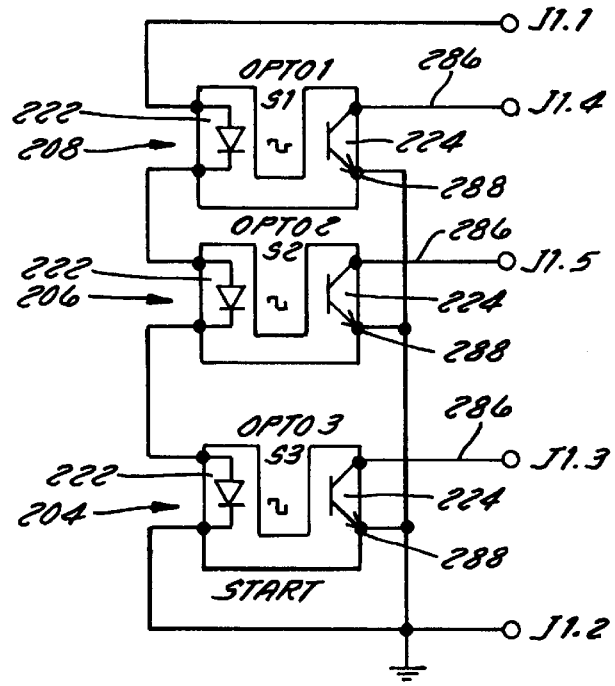
FIG. 15 is a schematic of the optoisolator slot sensors.

Referring additionally to FIG. 15, each slot sensor 204, 206 & 208 preferably comprises an optoelectronic sensor having an emitter 222 in one of the sensor arms and a detector 224 in the other of the arms for sensing when a slot 192 and/or 194 is located between the emitter 222 and detector 224 of a slot sensor. The emitter 222 preferably is an emitter of infrared light and preferably is an infrared light emitting diode which is detected by an infrared detector 224 when a locator slot is positioned substantially directly between the emitter 222 and detector 224 of a single slot sensor. Alternatively, the emitter 222 can be a visible light emitter and the detector 224 can be a visible light detector, if desired.

Preferably, each slot sensor 204, 206 & 208 is an optoisolator of conventional construction with each optoisolator having an emitter 222 contained in one sensor arm, 218 or 220, generally aligned with a detector 224 that is a phototransistor contained in the other arm, 218 or 220, for sensing or detecting when a slot 192 or 194 passes between the arms 218, 220 of the optoisolator. Alternatively, one or more of the slot sensors 204, 206 & 208 can be constructed and arranged such that a non-electrically conductive vernier tape 170 is received between a pair of electrodes (not shown) with one of the electrodes bearing against the tape 170 and making contact with the other electrode when a locator slot passes between the electrodes.

When a locator slot 192 or 194 passes between the arms 218 & 220 of a slot sensor, such as is depicted in FIG. 10, the slot sensor generates a signal, that preferably is an electrical signal, and communicates the signal to the computer 44. Depending upon which of the slot sensors generated the signal, the computer 44 will determine whether the vernier tape 170 and movable jaw 74 are in the home/start position or whether the movable jaw 74 has moved toward or away from the fixed jaw 72 a certain distance from the home/start position.

Referring to FIG. 6, two of the slot sensors, slot sensors 206 & 208, are spaced apart from each other by a distance that approximates or corresponds to the distance, d, between adjacent measurement locator slots 192. The home/start position slot sensor 204 is spaced from slot sensor 206 by a distance that approximates or corresponds to the distance, s, between the home/start position slot 194 and its nearest measurement locator slot 192. The home/start position slot sensor 204 is preferably the slot sensor that is located closest to the control handle 66.

Preferably, the home/start position slot sensor 204 is located at or very near the end of travel of the home/start position slot 194 for enabling detection of when the movable jaw 74 has reached its home/start position. To do so, the home/start position slot sensor 204 is located to sense the home/start position slot 194 when the movable jaw 74 is in its fully open position. Preferably, this coincides with when the control handle 66 has reached its fully forward position and is stopped from further forward movement by reaching the end of its guide slot 100 in the frame 56 of the wand 64.

Alternatively, the home/start position slot sensor 204 can be located distal to the other slot sensors 206 & 208 and adjacent the opposite end of the measurement vernier shown in FIG. 8, (ie. adjacent to the opposite end of the array of measurement locator slots 192 and where the cable 136 attaches to the vernier 170). Of course, in this configuration, the home/start position slot 194 would also be located at the opposite end of the array of measurement locator slots 192.

When the home/start position is reached, the home/start position slot 194 preferably is located between the emitter 222 and detector 224 of the home/start position optoisolator 204 causing its detector 224 to communicate a signal to the computer 44. Additionally, when the movable jaw 74 has returned to its home/start position, measurement locator slots 192 are also aligned between optoisolators 206 & 208 causing both optoisolators 206 & 208 to also signal the computer 44. When signals from all three optoisolators 204, 206 & 208 are received at substantially about the same time by the computer 44 it preferably (a) resets to zero a counter which keeps track of the position of the movable jaw 74 (jaw position counter) relative to the home/start position, and/or (b) compares the value of the jaw position counter and resets it to zero if it is not already at zero.

Preferably, the home/start position corresponds to when the movable jaw 74 is in its fully open position. Alternatively, the vernier tape 170 and home/start position sensing optoisolator 204 can be constructed and arranged, if desired, to detect a home position corresponding to when the jaws 72 & 74 are fully closed.

In the construction and arrangement of the vernier tape 170 and slot sensors 204, 206 & 208 shown in FIGS. 8, 11 & 15, optoisolator slot sensors 206 & 208 and the computer 44 form a quadrature detector that is able (1) to sense which direction the movable jaw 74 is moving and (2) to determine how close or how far the movable jaw 74 is away from the home/start position. By determining how far the movable jaw 74 is from the home/start position, the distance between the tree engaging surfaces 142 & 146 of the jaws 72 & 74 can be ascertained.

The optoisolator slot sensors 206 & 208 of the quadrature detector preferably are spaced slightly more than or slightly less than the distance, d, between the measurement locator slots 192 for enabling the quadrature detector to determine the direction of movement of the movable jaw 74. As a result of this optoisolator spacing, its detectors 224 are out of phase relative to the spacing between adjacent pairs of measurement locator slots 192. If spaced apart farther apart than the distance, d, between adjacent measurement locator slots 192, the optoisolators 206 & 208 must be spaced less than twice the distance (2d) between adjacent measurement locator slots 192.

Direction of movement of the vernier tape 170 and hence movable jaw direction can be detected by the quadrature detector optoisolators 206 & 208 because a slot 192 will be aligned first with one of the optoisolators when moving in one direction and a slot 192 will be aligned first with the other of the optoisolators when moving in the other direction.

For example, FIG. 11 illustrates the optoisolators 206 & 208 of the quadrature detector spaced apart a distance greater than the distance, d, between adjacent measurement locator slots 192. When the vernier tape 170 is moved in the direction of indicator arrow 226 shown in FIG. 9, moving the movable jaw 74 away from the fixed jaw 72, a measurement locator slot 192 will first pass through optoisolator 208 before a slot 192 will pass through optoisolator 206, causing the detector 224 of optoisolator 208 to be illuminated and a signal sent to the computer 44 before a signal is sent to the computer 44 from the other optoisolator 206. So long as the jaws 72 & 74 are moved apart from each other, the vernier tape 170 will continue moving in the same direction 226, and the detector 224 of optoisolator 208 will always be illuminated before the detector 224 of optoisolator 206, continually enabling a direction of movement that results in the jaws opening to be determined. Conversely, when the vernier tape 170 and jaw 74 is moved in the other direction, the direction indicated by indicator arrow 228, a measurement locator slot 192 first passes through optoisolator 206 before a measurement locator slot 192 passes through optoisolator 208, enabling direction of movement which results in the jaws closing to be determined.

During operation, the computer 44 monitors the signals communicated from the optoisolators 206 & 208 of the quadrature detector in a like manner to determine from which optoisolator 206 or 208 the signal came first from to determine which direction the movable jaw 74 is being moved. When direction is determined, the computer 44 counts how many times each optoisolator is illuminated when moving in that direction and increments or decrements the jaw position counter.

For example, when the movable jaw 74 is moved away from the home/start position causing it to move toward the fixed jaw 72, the counter is incremented as the optoisolators 206 & 208 are illuminated by a slot 192 passing by causing the distance between the jaws 72 & 74 displayed to be decreased in 0.25 inch increments. When a change in direction is detected, indicating that the movable jaw 74 is now being moved toward the home/start position thereby spreading apart the jaws, each illumination of the optoisolators 206 & 208 decrements the counter causing the distance between the jaws 72 & 74 to be increased in 0.25 inch increments.

As the control handle 66 is being moved during operation, the display 46 shows the distance between the caliper jaws 72 & 74 communicated to it by the computer 44. As is shown in FIG. 2, the display 46 comprises a frame 230, a display module 232, and a cover 234. The display module 234 preferably includes a display screen 236 capable of displaying alphanumeric characters and drivers for enabling the characters to be generated and displayed on the screen. These drivers are preferably integrated circuits, resistors, capacitors and/pr other components capable enabling a digital signal to be received from the computer 44 and causing characters to be generated and displayed on the display screen 236 In a preferred embodiment, the display screen is an LCD screen. Preferably, the display 46 is selectively tiltable to enable its viewing angle relative to the operator 60 be adjusted and is attached by a thumbscrew to a bracket 108 affixed to the wand 64.

IV. Computer Module and Data Storage

Referring to FIG. 12, the computer module 44 preferably includes a housing 238 that preferably is carried by the frame 56 of the support handle 58 but can also be carried by the extension wand 64. Within the housing 238 is a circuit board 240 (FIG. 2) carrying computer circuitry 242 which is shown in schematic form in FIGS. 13A & 13B. To enable the computer circuitry 242 to communicate with the display 46 and the sensor 76, there is an electrical cable (not shown) that connects the computer circuitry 242 to both the display 46 and the sensor 76. The memory cartridge 50 is preferably received in an opening in the computer module housing 238 and has an electrical connector that engages a complementary connector on the circuit board 240. To enable the computer circuitry 242 to communicate with a personal computer 52 (FIG. 12), the communications port 54 preferably is attached to the circuit board 240 and is exposed from the housing 238 so it can accept a data communications cable 244 linked to the personal computer 52.

The housing 238 preferably can be constructed of a plastic or another generally rigid material able to protect and support the electronic components inside. If desired, the housing 238 can be constructed of a metal, such as a steel or an aluminum. If the housing 238 is constructed of a non-metallic material, electrical shielding can be employed within the housing 238 to shield the electrical components of the computer circuitry 242 from radio frequency interference. However, such shielding is preferably not needed in a preferred embodiment of the invention.

As is shown in FIG. 12, the housing has a front face 246, a rear face 248, a top 250, a bottom 252, and two sidewalls 254 & 256 forming a box of generally rectangular cross section. Two components of the housing preferably form (a) the front face 246 and portions of the top 250 and bottom 252 and (b) the rear face 248 and complementary portions of the top 250 and bottom 252. In assembly, the two housing components interlock with each other around the tubular frame 56 of the support handle 58 and fasteners join them together. Although screws or bolts are preferably used to hold the housing components together and to secure the housing 238 to the support handle 58, a hook and loop fastener or another type of fastener can also be used.

To enable electrical power to be applied to the computer circuit 242 and to enable data shown on the display 46 to be manipulated, the front face 246 of the housing 238 has a keypad 258 that preferably is a low profile membrane keypad for simple assembly. To store data in memory, there is a data entry switch 80 carried by the support handle 58. The data entry switch 80 is preferably affixed to the support handle frame 56 adjacent the support handle grip 84 for enabling a finger or preferably a thumb of the operator 60 to easily reach the switch 80, such as in the manner illustrated in FIG. 1, to expedite data entry. This construction and arrangement is particularly advantageous when entering data for hundred or even thousands of trees because it allows extremely rapid and efficient entry and storage of tree data.

The data entry switch 80 preferably is a three position switch, having a rearward position (towards the operator 60) for entering data to memory 48, a forward position (away from the operator 60) for selecting data to be entered, and a middle position where no data is (1) entered into memory, (2) manipulated, or (3) selected for entry into memory. In a preferred embodiment, the switch 80 can be moved to its forward position to select the grade or quality of the tree for which data is being entered.

For example, if the switch 80 is moved to its forward position it will increment the grade or quality shown in the display 46 to the next value. To further toggle or increment the grade or quality value displayed, the switch 80 is released and once again moved to its forward position to press and close the switch 80. Once the desired quality or grade is displayed, the switch 80 is moved rearward to its data entry position and the desired quality or grade value shown in the display 46 is stored in memory 48.

Referring to the keypad 258 shown in FIG. 12, adjacent the communications port 54 the keypad 258 preferably has five keys for controlling operation of the computer circuitry 242. Preferably the keypad 258 has a POWER key 260 for powering up the computer circuitry 242, a RESET key 262 for resetting the computer circuitry 242, an ERASE key 264 for erasing a data entry so that it can be corrected, an UP key 266 for enabling an operator 60 to move a cursor in the display 46 upwardly along a data list of selections to select data, and a DOWN key 268 for moving the cursor downwardly along a data list of selections to enable data to be selected from the list. If desired, more or less keys can be used to control operation or the keys can be arranged in various orders.

A. Computer Circuitry

FIGS. 13A, 13B, 14 & 15 illustrate the computer circuitry 242 used in conjunction with the apparatus to measure tree diameter and record the diameter along with other information or related tree characteristics in a storage medium 48 that preferably is the memory cartridge 50. Appendix A presents a source code listing for controlling operation of a preferred embodiment of a microprocessor, IC1, of the computer circuit 242. During operation, the microprocessor, IC1, communicates with the optoisolators 204, 206, & 208, the display 46, a memory storage device, IC6 (FIG. 14), the keypad 258, the data entry switch 80, and a communications port conditioning chip, IC3 (FIG. 13A), during execution of the code presented in assembly language form in Appendix A.

1. Power Supply

Figure 13A:
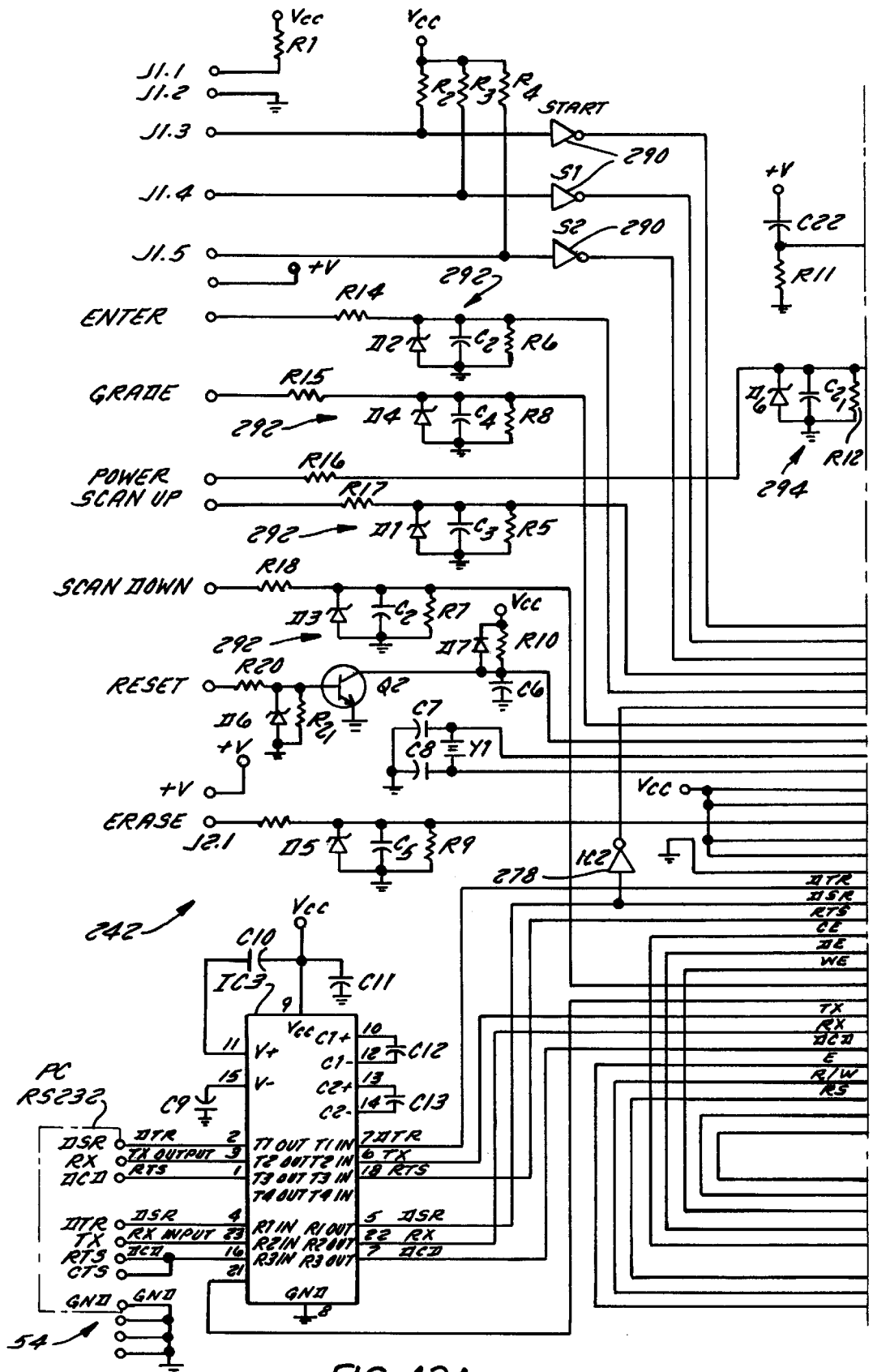
FIG. 13A is a schematic of the computer circuitry of the on-board computer module.
Figure 13B:
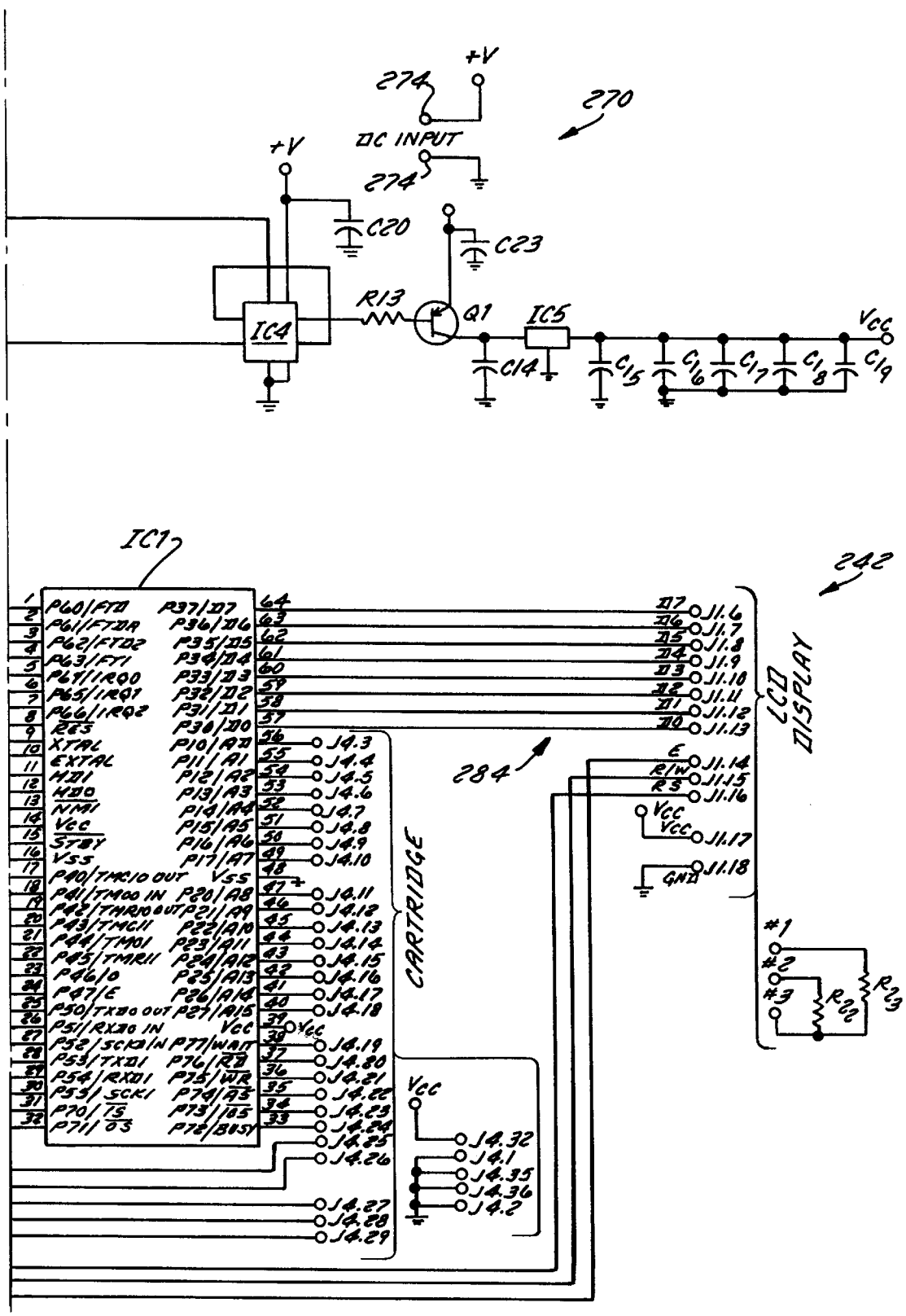
FIG. 13B is a schematic of the computer circuitry of the on-board computer module.

As is shown in FIGS. 13A & 13B, the computer circuit is in communication with a source of electrical power 270 that preferably is a direct current input, DC INPUT, such as a nine volt battery or another suitable direct current source. Alternatively, the ultimate source of electrical power 270 can be an alternating current source (not shown) rectified to produce direct current.

Referring to FIG. 13B, to condition and regulate electrical power received from the power source 270, the battery output terminals 272 & 274 are connected to a direct current input which is connected to a power supply circuit 276. The battery 270 is also directly connected to an integrated circuit, IC4, which controls operation of the power supply circuit 276. More particularly, IC4 is connected to the POWER key of the keypad 258 and supplies power to the power supply 276 when pressed causing the power supply 276 to supply electrical power to the rest of the computer circuitry 242.

IC4 preferably is a flip-flop that is continuously powered by the power source 270 to enable pressing of the POWER key to alternately power up the power supply circuit 276 and power down the circuit 276. In this manner, with the circuit powered down, the POWER key is pressed once to power up the circuit 276 and another time to power down the circuit 276. IC4 preferably is a conventional flip-flop such as what is found in a National Semiconductor CD4013BC Dual D flip-flop. As is depicted in FIG. 13B, only one such flip-flop is required for turning on and off the power supply 276.

In turning the power on, when the POWER key is pressed, IC4 applies electrical power to transistor, Q1, turning it on. With Q1 switched on, electrical power from the battery 270 is applied to a power regulator, IC5, that preferably is a voltage regulator for supplying electrical current at a desired voltage, Vcc, to the components of the computer circuit 242. To turn the power off, the POWER key is simply pressed again.

Preferably, IC5 supplies electrical current at a regulated voltage of about +5 VDC to the components of the computer circuit 242. In a preferred embodiment, IC5 is a National Semiconductor Corporation part no. LM 2930T-5.0 low dropout voltage regulator for conserving battery power where a battery power source is used. The power supply 276 also has a number of capacitors, C14–C19 and C23 connected between Vcc and ground for absorbing and minimizing transient currents and current spikes that can occur during the switching that takes place when one or more of the digital components of the circuit 242 changes an output from a low voltage value to a high voltage value or vice versa. These capacitors also serve as a current reservoir for providing additional current during periods of circuit operation that result in high current draw. Preferably, all of these capacitors also provide st least some noise filtering.

Capacitors, C16–C19, are each connected between the positive output, Vcc, from the voltage regulator, IC5, and the ground adjacent an electrical component being supplied power. For example, C16 can be connected between Vcc and ground adjacent the microprocessor, IC1. In a preferred embodiment of the computer circuit, each of capacitors C16–C19 have a value of about 0.1 microfarad.

Capacitor C15 is also used as a current reservoir to provide extra current in the event that a great deal of digital switching takes place during computer circuit operation. In a preferred embodiment, where a nine volt direct current battery supplies electrical power, C14 is about 100 microfarad. If rectified alternating current is used, C14 preferably is larger than 100 microfarad.

Capacitor C23 is also used as a current reservoir to provide additional current to the circuit upon startup when the POWER key is depressed causing IC4 to turn Q1 on. Preferably, C23 is also about 100 microfarad.

Capacitor C14 is connected to the output of Q1 and the ground for noise filtering current being applied to the voltage regulator, IC5. Capacitor C14 also functions as a current reservoir and preferably has a value of about 0.1 microfarad.

To supply power to the microprocessor, IC1, the positive output, Vcc, and ground are connected to IC1. As is shown in FIGS. 13A & 13B, Vcc is connected to pins 11, 12, 14, 15 and 39 of the microprocessor, IC1. The ground is connected to pins 16 & 48 of IC1, both pins of which are designated Vss on IC1. Preferably, about +5 VDC is supplied from the power supply 276 to the microprocessor, IC1. Alternatively, the power source 270 and power supply 274 can be constructed and arranged to supply another desired voltage or current or a combination thereof, if desired.

2. Microprocessor

The microprocessor, IC1, preferably is a microcontroller for controlling operation of the circuit components 242 and for interpreting the signals received from the optoisolators 204, 206 & 208 to determine tree diameter, display tree diameter and enable the tree diameter measurement to be stored in a storage device 48. In a preferred embodiment of the microcontroller, IC1, the microcontroller preferably is a Hitachi H8/322 microcontroller. Alternatively, another microcontroller can be used to control circuit operation, such as another microcontroller from the Hitachi H8/320 series of microcontrollers.

Should an alternate yet suitable microcontroller lack enough input/output ports to communicate with the electrical components of the apparatus, including the optoisolators 204, 206 & 208, the keypad 258, the memory storage 48, the display 46, and the communications port 54, additional integrated circuits, such as port expanders, multiplexers or other integrated circuits, can be used to expand the input/output capabilities of the microcontroller. In like manner, a conventional microprocessor that is not a microcontroller can also be used with suitable support integrated circuits.

Preferably, the microcontroller, IC1, is an 8-bit microcontroller. Alternatively, a 16-bit, a 32-bit, a 64-bit or even a larger microcontroller or microprocessor can be used. Preferably, a suitable microprocessor or microcontroller is in communication with at least about four thousand bytes of Read Only Memory (ROM) or its equivalent for storing its operating code (APPENDIX A) and at least about 32 bytes of Random Access Memory (RAM) or its equivalent for temporarily storing information used by the microprocessor or microcontroller during operation.

Although not shown, the preferred embodiment of the microcontroller integrated circuit, IC1, has an on-board central processing unit (CPU), an on-board serial communications interface, on-board programmable read-only memory (PROM), on-board RAM, internal data and address buses, and a plurality of input/output ports that are custom configured by operating code (APPENDIX A) that operates the microcontroller, IC1.

The operating code responsible for controlling operation of the microcontroller preferably is a machine language compiled version of the assembly language source code of Appendix A that is stored in PROM that is in communication with the CPU of the microcontroller. In a preferred microcontroller embodiment, the operating code is stored on its on-board PROM by being "burned into" the on-board PROM by a chip programmer (not shown). Alternatively, the operating code can be stored on a separate ROM or another suitable data storage device that is in communication with the microcontroller, IC1, to provide the microcontroller, IC1, with instructions for controlling its operation.

As is shown in FIGS. 13A & 13B, the microcontroller, IC1, has a plurality of input/output ports for interfacing with and controlling operation of the various electrical components of the circuit 242 and connected to the circuit 242. Each port is made up of a number of output pins of IC1, each of which is identified by port number and bit number. For example, P11 labeled on pin 55 of IC1 identifies pin 55 as being port 1, bit 1 of that port.

Port 1, labeled P10–P17 and which comprises pins 49–56 of IC1, is a first set address lines, A0–A7, that are connected to a memory chip, IC6, of the memory cartridge 50. Port 2, labeled P20–P27 and which comprises pins 40–47 of IC1, is a second set of address lines, A8–A15, connected to IC6. Port 7, labeled P70–P77 and which comprises pins 31–38, is a set of data lines, designated by labels IS, OS, BUSY, IOS, AS, WR, RD, and WAIT, connected to IC6. Part of port 4, namely, port I/O labeled P43, P44 and P45 corresponding to pins 20–22 of IC1, are connected to the control lines WE (write enable), OE (output enable) and CE (chip enable) of IC6.

During operation, IC1 communicates via the memory control lines connected to pins 20–22 of IC1 as to what memory storage operation is going to be performed. If data is going to be stored, IC1 sends along its pins 40–47 and 49–56 an address to IC6 to designate the location the data is to be stored and sends the data that is to be stored in IC6 on its pins 31–38. If data is going to be read from IC6, IC1 sends on its address lines the desired address where the data is stored to IC6 and IC6 reads the data on its data lines.

Port 3, labeled P30–P37 and which comprises pins 57–64 of IC1, is a set of data lines connected to the display module 232. The control lines for controlling operation of the display module 232 are connected to part of port 5 of IC1. More particularly, P55, P54 and P53 corresponding to pins 28–30 of IC1 are connected to control lines E (erase), R/W (read/write) and RS (busy) of the display.

Part of port 4 and part of port 5 of IC1 are in communication with the communications port 54, which preferably is an RS232 port 54 capable of bidirectional serial communications between IC1 and a personal computer 52 connected to the RS232 port 54. To provide the proper signal strength for RS232 operation, ports 40, 41, 42, 50, 51, and 52, corresponding to IC1 pin nos. 17–19 and 25–27, are connected to an RS232 line driver/receiver integrated circuit, IC3.

To enable stored data to be sent to the port 54 from IC6, port 40 (pin 17) is connected to the DTR line (data terminal ready) of the RS232 port 54, port 50 (pin 25) is connected to the port's TX line (data out), and port 42 (pin 19) is connected to the port's RTS line (ready to send). The DTR and RTS lines are control lines for enabling IC1 to handshake with a personal computer 52 connected to the communications port 54 to enable data to be sent from memory, IC6, via IC1 to the personal computer 54. TX is a serial data line of the port 54 over which digital data is transmitted from memory, IC6, via IC1 to the personal computer 52.

To enable the personal computer 52 to communicate with IC1, port 41 (pin 18 of IC1) is connected to the DSR line (data set ready), port 51 (pin 26) is connected to the RX line (data receive), and port 52 (pin 27) is connected to the DCD line (data carrier detect) of the RS232 port 54. The DSR and DCD lines are control lines for enabling IC1 to handshake with a personal computer 52 connected to the communications port 54 to enable data to be sent from the computer 52 to IC1 which preferably is stored in memory, IC6. RX is a serial data line over which digital data can be transmitted from the personal computer 52 to IC1. Data sent from the personal computer 52 to IC1 can preferably be stored in memory, IC6.

An inverter, IC2, also connects the DSR line of the RS232 communications port to I/O port P65, which is defined by the operating code of the microcontroller, IC1, as interrupt, IRQ1. The DSR line is tied by an inverter 278 to interrupt IRQ1 to indicate to IC1 when a cable 244 has been attached from the RS232 communications port 54 to a personal computer 52. When a cable 244 is attached, an interrupt IRQ1 will be generated causing IC1 to give the interrupt, IRQ1, priority causing it to execute a routine of the operating code (APPENDIX B) which prepares IC1 to send data to the connected personal computer 52 or receive data from the personal computer 52. During operation and with a cable 244 connected to the personal computer 52, data is transmitted from memory, IC6, synchronously or asynchronously.

The optoisolators 204, 206 & 208, UP key, and the GRADE and ENTER switches are all connected to port 6 of IC1. The output of optoisolator 204 is connected to P60 (pin 1) of IC1. The output of optoisolator 206 is connected to P61 (pin 2) of IC1. Similarly, the output of optoisolator 208 is connected to P62 (pin 3) of IC1. While the UP key is connected to P63 (pin 4), the DOWN key is connected to P46 (pin 23) of IC1.

During normal operation of IC1, the I/O ports of the IC1 connected to the optoisolators and the UP and DOWN keys are continuously scanned by IC1. If a signal is received from one of these components, the appropriate routine of the microcontroller operating code is executed (depending upon the priority of the signal received).

The ENTER key is connected to P64 (pin 5) of IC1 which also is interrupt IRQ0. When the ENTER key is pressed, an interrupt (IRQ0) is generated causing data to be stored either (1) in a temporary memory location or (2) in the memory cartridge. The temporary memory location preferably is the RAM inside IC1.

The GRADE key is connected to P66 (pin 7) of IC1 which is interrupt IRQ2. When the GRADE key is pressed, an interrupt (IRQ2) is generated causing the microcontroller operating code to toggle or scroll through grade choices displayed on the display 44.

The ERASE key is also connected to an interrupt. The ERASE key is connected to interrupt NMI and its pressing executes a routine of the microcontroller operating code which erases part or all of a data entry. In a preferred method, pressing the ERASE key causes the most recent data entered to be erased and then allows reentry of the erased data.

The RESET key is connected to the reset RES pin (pin 8) of IC1. The RESET key is connected to a transistor Q2 and Vcc. When pressed, it causes IC1 to reinitialize itself as if it had been powered up by supplying it with power after it had been powered down.

Pins 9 & 10 of IC1 are connected to a crystal that preferably is a 7.3728 Mhz for providing IC1 with an equivalent clock rate. In its preferred embodiment, IC1 can be operated at a maximum clock rate of about 10 Mhz. For other microprocessors and microcontrollers, a faster or slower clock rate can be used.

Pins 16 & 48 of IC1 are connected to ground. Pins 39, 11, 12, 14 & 15 are connected to Vcc from the power supply. Pin 15 is connected to Vcc to always tie it high when IC1 is powered up so that IC1 does not go into a standby or power conserving mode.

Pins 11 & 12 are connected to Vcc to tie them high when the power is on to select an operating mode of IC1 causing its CPU to use its on-board ROM and on-board RAM during operation in the execution of its operating code. Alternatively, the pins can be configured to cause the microcontroller to communicate with external ROM, such for its operating code. For example, pin 12 can be connected to Vcc and pin 11 not be connected to any source of voltage to put IC1 in a mode enabling it to communicate with an external ROM containing its operating code. Of course, a port expander or multiplexer may be required to enable IC1 to communicate with all of the components of the circuit 242 and the external ROM.

3. Communications Chip and Port

The serial communications chip, IC3, preferably is a communications port line driver/receiver in communication with the communications port 54 for bringing the output signal of IC1 up to the proper voltage level and for dropping an output from the personal computer 52 received by the communications port 54 to the appropriate voltage level so it can be received by IC1. If the communications port outputs and inputs of IC1 are at the appropriate voltage level, no line driver/receiver preferably is needed.

In a preferred circuit embodiment, the line driver/receiver, IC3, is a MAXIM 236 capable of receiving communications port output from IC1 at a voltage of about +5 VDC and stepping up that output to a voltage level of about +12 VDC so that the output will conform to RS232 communications port standards. Similarly, the driver/receiver chip, IC3, drops the voltage of output received from a personal computer 52 connected to the RS232 port 54 from about +12 VDC to about +5 VDC for receipt by IC1.

To enable the RS232 port 54 to be driven at the desired +12 VDC output, IC3 has an on-board switching power supply at pins 8–15 of IC3. As is shown in FIG. 13A, a Vcc of preferably about +5 VDC is connected to pin 9 of IC3. Pin 8 of IC3 is connected to ground. Capacitor, C11, connects Vcc to ground and preferably has a value of about 1 microfarad. One lead of a capacitor, C10, which preferably has a value of about 1 microfarad, is connected to Vcc and the other lead of C10 is connected to pin 11 of IC3. Pins 10 & 12 of IC3 are connected by a capacitor, C12, which preferably has a value of about 1 microfarad. Pins 13 & 14 of IC3 are connected together by another capacitor, C13, which also preferably has a value of about 1 microfarad.

As is shown in FIG. 13A, pins 7, 8, & 9 of IC3 are respectively connected to the DTR, TX and RTS lines of IC1. The stepped up DTR, TX and RTS outputs are communicated from pins 2, 3, & 1 of IC3 respectively to the DSR, RX and DCD lines of the personal computer 52 connected to the RS232 port 54.

Pins 5, 22 & 17 of IC3 are respectively connected to the stepped down DSR, RX and DCD lines of IC1. Pins 4, 23, & 16 of IC3 are respectively connected to the DTR, TX & RTS lines of the personal computer 52. A pin of the RS232 port 54 that is connected to the CTS line of the personal computer 52 is preferably tied to the DCD output from IC3. The remaining pins of the RS232 port 52 are tied to ground. The shielding of the cable 244 is also tied to ground.

The RS232 port 54 preferably is a conventional RS232 port which utilizes a standard 9 pin DB9 connector 280 for connection with a shielded cable 244 having a complementary DB9 connector 282. Although an RS232 port 54 using a cable 244 connected between the port 54 and a personal computer 52 is preferred, another kind of communications port or communications medium can also be used. For example, a parallel communications port can be used. Additionally, an infrared transceiver can be used to communicate digital information back and forth between a computer and the apparatus. Alternatively, digital data can be transmitted between a personal computer 52 and the apparatus 40 using radio waves, if desired.

4. Display

The display 46 is connected to the data lines of port 3 of IC1 and to the control lines of P53, P54 & P55 of IC1. Preferably, the display module 232 includes an LCD display having a screen 236 with the ability to display two rows of twenty characters that can be letters, numbers or other characters formed by arranging pixels of the display screen 236. Alternatively, the display 46 can be an LED display or another type of suitable display. If desired, the display 46 can be constructed so as to be able to display more or less characters, but it preferably is constructed to display at least about forty characters at one time.

Preferably, the display 46 is a module 232 that includes a circuit board (not shown) that has integrated circuits for driving the display screen 236 and controlling its operation in response to control and data signals from IC1. During operation, the display 46 communicates with IC1 to display various characters needed to facilitate data entry and to show the tree diameter measurement.

The data and control lines from IC1 connect to the display 46 by a cable 284 (FIG. 13B) that preferably is a ribbon cable. Preferably, the ribbon cable is passes through the hollow in the support handle 58 and extension wand 64 to connect IC1 and the display 46 together.

Individual wires of the cable 284 are schematically represented in FIG. 13B and are designated by reference labels J1.6–J1.18. A wire corresponding to J1.17 communicates Vcc to the display 46 and a second wire, J1.18, connects the display to ground. To control the contrast of the LCD display screen 236, a resistor, R23, of about one thousand ohms is connected between a first and a third pin of the display module (#1 & #3 shown in FIG. 13B), and another resistor, R22, of about ten thousand ohms is connected between a second pin and the third pin (#2 & #3 shown in FIG. 13B) of the display module.

5. Memory Storage and Data Format

To store the tree diameter measurement and other information for a plurality of trees, IC1 communicates with memory storage 48 that preferably is a portable and removable memory storage cartridge 50. Within the memory storage cartridge is a memory chip, IC6, schematically represented in FIG. 14, which preferably is an Electronically Erasable Programmable Read Only Memory (EEPROM). Preferably, IC6 is an ATMEL AT28C256 256K paged CMOS EEPROM memory storage chip capable of storing 32,768 words of eight bit length (32K×8) which is capable of storing 32,768 ASCII characters. However, if desired, the storage size of the EEPROM or other memory used to store tree data can be more or less. For example, an EEPROM having a storage capacity of 65,536 eight bit words or an even larger storage capacity can be used.

Alternatively, a static RAM chip of a flash memory unit of suitable memory capacity can also be used to store tree data and diameter measurements. If static RAM is used, electrical power is supplied to the static RAM chip at all times to preserve the contents of its memory to preserve data already stored on the static RAM chip.

If desired, although less practical, another type of storage medium can be used to store tree data. For example, a disk drive can be used to transfer data for each tree measured from IC1 to a disk received in the drive or in communication with the drive (ie. a hard drive). If desired, dynamic RAM or DRAM can be used, providing it is appropriately powered and refreshed to retain its memory contents.

The memory cartridge 48 has a connector (not shown) that mates with a complementary connector (not shown) that is attached to the circuit board 240 of the computer circuit 242 so that it can be quickly and easily removed and replaced with another memory cartridge 48, if desired. Reference labels J1.1–J1.36 of FIG. 14 identify the output leads of the connector of the computer cartridge 48. Although the EEPROM memory chip, IC6, is received in a portable memory cartridge 48, IC6 can be permanently located and fixtured on board the computer circuit board 240, if desired.

Figure 14:
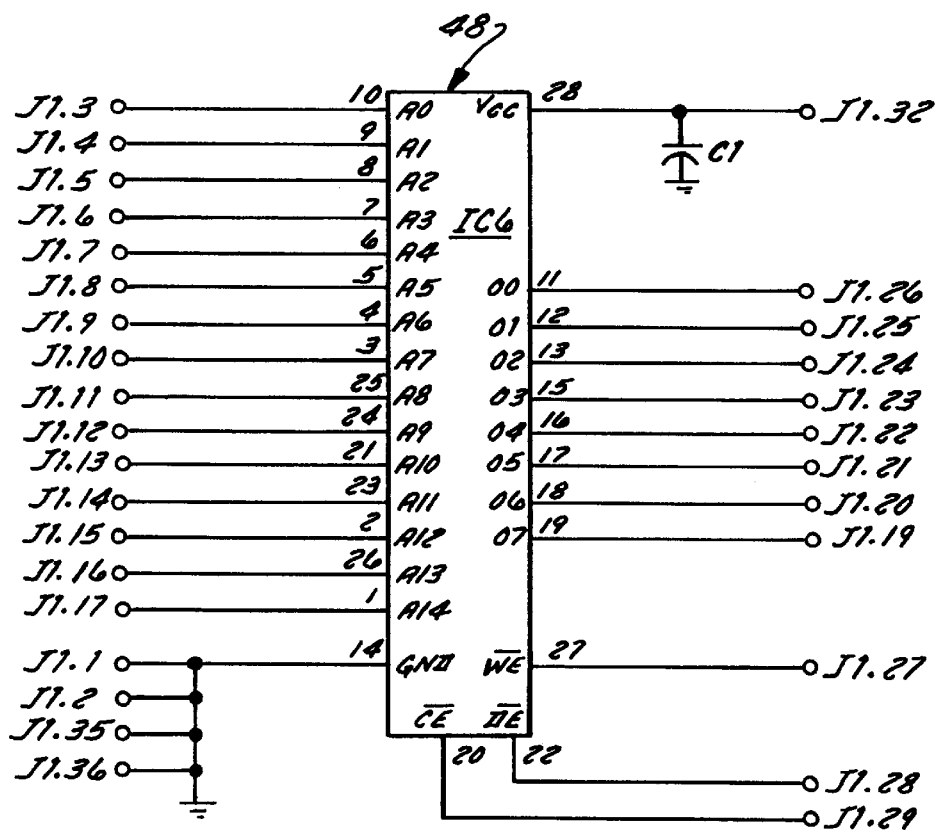
FIG. 14 is a schematic of the memory storage unit used to store tree diameter, location, variety and grade data.

Referring to FIG. 14, the memory address lines of pins 40–47 and 49–56 of IC1 make contact with connector leads J1.3–J1.17 which connect to the address lines A0–A14 of IC6. The data lines of pins 31–38 of IC1 make contact with connector leads J1.19–J1.26 that connect to the data lines of IC6. The control lines of pins 20–22 of IC1 make contact with J1.27–J1.29 that connect with the control lines of IC6. Vcc is connected to lead J1.32 and the ground is connected to leads J1.1, J1.2, J1.35 & J1.36.

During operation, tree data preferably is transferred from IC1 to memory, IC6, upon the pressing of the ENTER key. This data includes the type or variety of the tree, its location and thereafter tree size (diameter) and grade information. In a preferred data format, to conserve memory, tree location and variety are stored only when a change is made to either (a) tree location, or (b) tree variety. Where no change in tree location or variety has been made for successive tree measurements, only the measurement and the grade will be stored in memory, IC6.

Preferably, data is stored in memory, IC6, in the following format: tree variety 1, tree location 1, tree 1, tree 2 . . . tree variety 2, tree location 2, tree 1, tree 2, . . . A sample of an exemplary stored data sequence is shown below in Table 1:

TABLE 1

%10%%05%425A600B250A275B%08%%05%450A575B%08%%04%-600A

In the first portion of the string of stored data shown above in Table 1, the tree variety preferably is stored first and immediately thereafter tree location is stored. Alternatively, tree location can be stored first followed by tree variety, if desired. To indicate tree variety and location, the delimiter % is used in front of and behind the numerical or alphanumerical value representative of tree variety and location. Therefore, in the string of stored data depicted in Table 1, %10%%05% represents tree variety ten and tree location five.

Tree variety and location information are both stored when a change is made to either variety or location. In the example of Table 1, tree variety is changed from variety ten to variety eight after measuring a few trees of variety ten. Even though tree location did not change, location five is preferably stored again when the tree variety change is made. Therefore, after measuring a few trees of variety ten and location five, the variety and location data stored upon the change to variety eight is: %08%%05%.

The last change of variety/location illustrated above is location change. Even though variety did not change when the tree location being measured changed from location five to location four, the variety data was stored along with the location data in the following form: %08%%04%.

Following a change in tree variety or location, tree size and grade information is stored for as many trees as fall in the selected variety and location and until a change in variety and/or location is made. For each tree measured, the tree size and then its grade is stored. Data for one tree after another is stored sequentially in this manner until a change in variety or location is made.

In a preferred data storage format suitable for trees having a diameter of less than ten inches, tree size and grade data is stored in four bit word lengths (ie. four character lengths). An example of a four bit tree size and grade entry used in the preferred format is: 425A. This translates into a grade A tree having a diameter of 4.25 inches. The first number is presented in inches, the second and third numbers are presented in fractions of an inch (ie. tenths and hundredths of an inch). The portion of the data shown above in Table 1 relating to tree size and grade for the first group of trees stored having a variety ten and location five is repeated herein as 425A600B250A275B. This translates into a first tree of grade A and 4.25 inch diameter, a second tree of grade B and 6.00 inch diameter, a third tree of grade A and 2.50 inch diameter and a fourth tree of grade B and a 2.75 inch diameter.

For the preferred memory chip, IC6, about 31,488 character storage positions are dedicated for storage of tree information including tree variety, tree location, tree size and grade. If trees for only one location and variety are measured, tree size and grade information for as many as 7,870 trees can be stored on a single memory cartridge 48 containing the preferred IC6. For each variety and/or location change, IC6 can store size and grade data for two less trees than the 7,870 value listed above. For example, if there are ten changes in variety/location during use of a single memory cartridge 48 containing the preferred IC6, the memory cartridge can store size and grade information for 7,852 trees. Of course, if a larger memory chip is used, more tree data can be stored on a single cartridge 48.

The remaining data storage available in the memory chip preferably is used to hold a list of tree variety and tree location information that is displayed and selected by the operator 60 during operation. Preferably, the list of tree varieties and locations that can be selected during operation of the tree measurement apparatus 40 is custom configurable using software, such as the software represented in source code form in Appendix B, operating on a personal computer 52. Preferably, once the variety list has been determined by a user of the software, it is downloaded to the memory cartridge 48 through the RS232 communications port 54.

In a preferred implementation of the operating code of IC1, a table of variety and/or location codes are defined in the microcontroller PROM with the names of the tree varieties corresponding to a list of active and selectable tree varieties stored in the memory cartridge 48. In another possible implementation, the variety names can be stored in the microcontroller PROM along with corresponding codes with a list of active and selectable codes stored in the memory cartridge. Likewise, the microcontroller PROM can contain a table of location codes with a list of active and selectable location codes stored in the memory cartridge 48. The active and selectable codes are those codes that can be selected by the operator 60 during operation of the apparatus 40.

In the preferred data storage format shown in Table 1, each change in variety or location uses eight character storage positions of memory. If two different delimiters are used, one delimiter can be used to indicate variety and another delimiter can be used to indicate location so that each change in variety or location will use less memory.

In a preferred embodiment of the apparatus, the apparatus 40 is constructed and arranged such that it can measure trees having a diameter of up to about six inches. As such, the storage of tree diameter and grade information requires only four character storage locations of memory 48, thereby efficiently minimizing the amount of memory used per tree measured and inventoried. Should the measurement apparatus 40 be constructed and arranged to measure trees having a diameter in excess of ten inches, the preferred method of storage disclosed above preferably can be modified to use five or more characters of memory storage per tree.

If desired, additional information for each tree measured can also be stored in the memory cartridge 50 when the diameter and grade are stored. For example, if the measurement apparatus 40 is to be used to measure timber used to produce lumber, an estimated board feet measurement can preferably be inputted and stored. Alternatively, in some instances it may be desirable to also estimate and/or measure the height of the standing tree so that board feet calculations can later be made. Similarly, the apparatus 40 can be used to measure various characteristics of fallen timber, including length, in this general manner.

If it is desirable to store this or other kind of additional information per tree, the data storage format discussed above and exemplified in Table 1 can be modified. For example, such additional information can be stored for a tree before or after the tree diameter and/or grade are stored.

5. Optoisolators

As is shown in FIGS. 13A & 15, the optoisolators 204, 206 & 208 are in communication with the microcontroller, IC1, so that the position of the movable jaw 74 relative to the fixed jaw 72 can be determined. To provide light energy that can be sensed by the detector 224, the light energy sources 222 of optoisolators 204, 206 & 208 are connected together in series, having one end connected to Vcc from the power supply 276 and the other end connected to ground. Preferably, each light energy source 222 of each optoisolator is a light emitting diode (LED) that emits infrared energy. Preferably, a resistor, R1, of about two hundred and twenty ohms is also connected in series with the power supply 276 and the optoisolator LEDs 222.

Each optoisolator is comprised of a light sensor 224 that outputs an electrical signal when enough light energy from an associated LED 222 reaches the light sensor 224. Preferably, each light sensor 224 is a phototransistor having an emitter 286 and a collector 288. Each collector 288 of each phototransistor 224 is connected to ground and each emitter 286 of each phototransistor 224 is connected to Vcc of the power supply 276. Preferably, the phototransistors 224 of the optoisolators 204, 206 & 208 are connected in parallel to the power supply 276. A resistor (R2, R3, & R4) is connected in series between the emitter 286 and Vcc with the resistor preferably having a value of about 100,000 ohms.

The emitter 286 of each phototransistor 224 is connected to an I/O port of the microcontroller, IC1. To square up the leading edge of an output signal from an optoisolator so it can be accurately read by IC1, there preferably is an inverter 290 (FIG. 13A) between the emitter 286 of each phototransistor 224 and its associated I/O port of IC1.

The output of optoisolator 204, which detects home/start position, is connected to I/O port P60 of IC1. When the movable jaw 74 is in its fully open position, the home position slot 194 of the vernier tape 170 is located between the LED 222 and phototransistor 224 of optoisolator 204 causing the LED 222 to illuminate the phototransistor 224 and optoisolator 204 to communicate a signal to I/O port P60 of IC1. When P60 of IC1 receives a signal from home/start position optoisolator 204, it preferably causes a routine of the microcontroller operating code to be executed preferably resetting an internal counter or register of IC1 dedicated to keeping track of the relative movement of the movable jaw 74.

The output of optoisolator 208 is connected to port P61 of IC1 and the output of optoisolator 206 is connected to port P62 of IC1. In operation, as a locator slot 192 of vernier tape 170 moves between an LED 222 and a phototransistor 224 of an optoisolator 206 or 208, a signal from the optoisolator is communicated to an I/O port of IC1. During operation, the operating code of the microcontroller determines, based upon the order that signals are first received from optoisolators 206 & 208, which direction the movable jaw 74 is moving. Thereafter, as the locator slots 192 of the vernier tape 170 pass by the optoisolators 206 & 208 during tree measurement, IC1 counts the number of signals or pulses received from the optoisolators 206 & 208 and increments or decrements an internal counter or storage register of IC1.

Depending upon the direction of movement of the movable jaw 74, the counter is used to determine how far the movable jaw 74 has relative to the home/start position. Since the distance between jaws 72 & 74 is a known value when the movable jaw 74 is in the home position, the operating code can determine the distance between the jaws 72 & 74 and preferably displays this value in real time on the LCD display screen 236.

6. Keypad and Data Entry Switch Inputs

The UP, DOWN, RESET and ERASE keys of the keypad 258 are all connected to I/O ports of the microcontroller, IC1, for controlling operation of IC1. Additionally, the contacts of the ENTER and GRADE data entry switch 80 are also connected to I/O ports of IC1. During operation, the operating code of IC1 executes various routines when IC1 receives a signal from these keypad and data entry switch inputs.

Of course, each of the keys of the keypad 258 are associated with an electrical switch that preferably closes when the key is pressed. To enable a key or switch to provide an electrical signal to an I/O port of IC1, each key or switch is in communication with a source of electrical power that preferably is Vcc, with the switch or key being located between Vcc and its associated I/O port.

To prevent static discharge from disrupting operation or even damaging a circuit component, each of these inputs has a static electricity protection circuit 292 between each of the inputs and its associated I/O port of IC1. Each static electricity protection circuit preferably comprises a diode, a capacitor, and a resistor connected in parallel between the line from the keypad key or switch and ground. For example, for the ENTER key, D2, C2 and R6 are connected in parallel from the electrical circuit connection leading from the ENTER key to I/O port P64 of IC1 to ground.

In a preferred static protection circuit embodiment 292, the capacitor is a one microfarad capacitor and the resistor is a one hundred thousand ohm resistor. The diode preferably is a 5.6 volt Zener diode such as an 1N5232 Zener diode for clamping static electric transients. Preferably, there is a similar static protection circuit 294 disposed between the POWER key and the flip-flop, IC4.

During operation, when prompted and when the UP or DOWN key is pressed, an electrical signal is communicated to the I/O port associated with that key. In the case of the UP key, a signal is communicated to port P63 of IC1 which causes a subroutine in the operating code of IC1 to be executed. This subroutine causes a cursor on the display screen 236 to be scrolled upwardly relative to a data list that is stored in memory in IC1 or preferably in the memory storage cartridge 50. Likewise, in the case of the DOWN key, a signal is communicated to I/O port 46 of IC1 which causes execution of a subroutine scrolling the cursor downwardly. Operation of the UP and DOWN keys preferably is only enabled by the operating code when tree variety or tree location is being selected by the operator 60. Of course, if desired, the UP and DOWN keys can be enabled in other situations, especially if data lists are used in the selection and storage of other tree related data.

The ERASE key is connected to interrupt NMI of IC1 and when pressed causes a routine to be executed that erases the last entry stored in the data cartridge 50. Preferably, the most recently stored information for a single tree is erased when the ERASE key is pressed. If some tree information has been entered for a particular tree and entry has not yet been completed for that tree, pressing the ERASE button preferably simply erases that most recently entered information, allowing an operator to reenter information for that tree.

The RESET key is connected to the reset of IC1 and when pressed causes IC1 to reset itself. When a communications cable 244 is connected between the communications port 54 and a communications port of a personal computer 52 running software capable of transferring data to and from the memory cartridge 50, the RESET key is also pressed to cause IC1 to be put in a mode which enables communication through the communication port 54. With a communications cable 244 connected between the communications ports of the computer 52 and measurement apparatus 40, a signal is sent to interrupt IRQ1 causing execution of a routine of the operating code enabling communication to occur between the computer 52 and IC1 for transferring data to and from the memory cartridge 50.

The GRADE switch is connected to interrupt IRQ2 and causes the operating code to execute a routine that toggles between tree grades each time the GRADE switch is pressed. In a preferred implementation, pressing the GRADE switch toggles between two grades, grade A and grade B. Alternatively, pressing the GRADE switch can permit selection from more than two grades. In a preferred implementation, the GRADE routine is only enabled after a tree location and variety have been selected. For example, upon power up, tree location and variety must first be entered before the grade is selected and entered into memory 48. Pressing the GRADE switch during selection and entry of tree location and variety preferably has no effect.

The ENTER switch is connected to IRQ1 and executes a routine when pressed that in some instances causes data to be stored to memory 48. For example, after selection of tree location, the ENTER key is pressed, causing the desired tree location selection to at least be stored temporarily in memory, such as in a register of IC1 in the on-board RAM of IC1. After selection of tree variety, the ENTER key is pressed, causing both the desired tree location selection and the desired tree variety selection preferably to be stored in the memory cartridge 50. After the desired grade is selected by pressing the GRADE key and the jaws 72 & 74 of the caliper 70 in engagement with the tree being measured, pressing of the ENTER keys causes both the tree diameter measurement shown in the display screen 236 and the selected grade to be stored in the memory cartridge 50.

V. Software

A listing of a preferred implementation of tree data processing software is presented in MICROSOFT VISUAL BASIC source code form in Appendix B. The tree data processing software runs on a computer that preferably is an IBM compatible personal computer, such as a personal computer, like the personal computer shown in FIG. 12, having an 80286, 80386, 80486, 80586 or even a larger microprocessor. During its operation, it enables the personal computer 52 to receive tree data stored in a memory cartridge 50 and store the data, in the form of a master tree inventory data list, in a memory storage device, such as RAM, a floppy disk, a hard disk, or another type of storage medium. Preferably, the master tree inventory data list contains all tree location, variety, size and grade data entered during use of the measurement apparatus 40 and downloaded from one or more cartridges 50 to the personal computer 52. When received, the software preferably manipulates the data from the memory cartridge 50 so it is in a format that can be displayed on a computer screen, a video terminal, printed on paper, or otherwise reduced to a tangible medium of expression.

The software is organized having menus for (1) enabling setup of the software, (2) adding to and deleting tree locations from a master location list, (3) adding to and deleting tree varieties from a master variety list, (4) transferring information to and from a memory cartridge 50, (5) generating reports that can be printed, displayed or stored to disk, and (6) a menu selection for quitting the software. Selection of a menu item preferably causes a window having one or more fields for receiving data to be displayed. During operation, a user of the software preferably uses a mouse, a computer keyboard key, key combinations or another method of input to select from one of the menus. Preferably, messages are given to confirm selection and entry of at least some, if not all, data or information entered, deleted or edited during program use.

In a preferred implementation, pressing the ALT key of a computer keyboard activates the menu with a menu selection highlighted. Pressing the appropriate arrow key moves the highlighting up, down, left or right, depending upon which key is pressed. Pressing the ENTER key executes the highlighted selection. Pressing the TAB key when a menu has been selected moves highlighting from one field of its associated window to another field. Pressing both the SHIFT and TAB keys at the same time returns the highlighting to the previous field.

In accessing the setup menu, a window is preferably displayed which allows entry of a name or identifier which will appear at the top of all reports generated by the software. Other selections which can be made in the setup window include whether tree sizes are displayed in Metric or English units, selection of which communication port of the computer that the communications link with IC1 is connected, the location of a backup floppy disk drive, and a selection for closing the window. If tree size measurements are received from a memory cartridge 50 in English units, the software preferably can execute a conversion routine to convert the English tree size measurements from English to Metric units.

The tree location menu allows a master list of tree locations to be created, added or deleted. If locations are to be added, an appropriate menu item is selected causing a window for adding a tree location to be displayed on a display screen of the computer 52. In a preferred implementation of the software of this invention, tree locations are added to the master list in the form of two character codes. Although descriptive location labels are preferably not associated with each two character location code, if desired, the software can preferably be modified to allow the entry and storage of such labels.

Preferably, the tree location code consists of two alphanumeric characters. During the transfer of tree location and variety information from the computer 52 to the memory cartridge 50 connected to the measurement apparatus 40, preferably only a single two digit location code or a few location codes from the master list are transferred to and stored in the memory cartridge 50.

If a menu item of the tree locations menu is selected enabling tree locations to be deleted from the master tree location list, at least a portion of the master tree location list is displayed in a portion of a window on the computer screen that preferably is scrollable. Preferably, the location to be deleted is selected by highlighting it and thereafter the ENTER key of the personal computer 52 is pressed to actually delete the selected location from the list. Once a location is selected to be deleted, pressing the ENTER key of the personal computer 52 preferably causes a window to be displayed on the computer screen to confirm that the selected location is the location that is to be deleted. If the selection is confirmed, the selected tree location is deleted from the master location list. After editing the master location list, it preferably is stored on disk or the like so it can later be retrieved to set up another memory cartridge 50.

If it is desired to add, edit or delete the master tree variety list, the tree variety menu is accessed and an appropriate menu item selection is made. If it is desired to add a tree variety to the list, a menu item selection is made which causes a window for adding a tree variety to be displayed. This window preferably has a field for entry of a two character tree variety code to be entered and another field for entry of a tree variety description.

Preferably, each tree variety code of the master tree variety list can be a code of up to ten characters in length that preferably corresponds to a two digit numerical code stored in a table created by the operating code of IC1 when tree variety list information is transferred from the computer 52 to a memory cartridge 50. During the transfer of at least a portion of the tree variety master list data from the computer 52 to a memory cartridge 50 connected to the measurement apparatus 40, preferably only the tree variety descriptions for the location(s) already downloaded to the cartridge 50 are transferred to and stored in the memory cartridge 50.

If it is desired to edit the master tree variety list, a menu item enabling the list to be edited is selected from the variety menu and the tree variety list item to be edited is selected. Thereafter, the selected code and description appear in a code and description field where they can be edited. When done editing, a software button of the edit screen is preferably pressed to cause the edited tree variety list item to be stored and the edit window to be closed.

To delete an entry from the master tree variety list, a menu item enabling deletion of tree varieties from the master list is selected from the variety menu and a window displaying the master tree variety list is displayed. Thereafter, the desired tree variety is selected and deleted from the list, preferably after the selection of the variety to be deleted has been confirmed.

The software preferably also has a menu for enabling information to be transferred to and data to be transferred from a memory cartridge 50 connected to the measurement apparatus 40. To set up or configure a connected cartridge 50, the cartridge menu preferably has a menu item that enables certain tree locations and desired varieties from their respective master lists to be transferred to and stored on the cartridge 50. Once configuration is done, the tree location and variety information is transferred to the cartridge 50. In doing so, the selected tree location codes and variety descriptions are preferably transferred to and stored in the cartridge 50. If desired, in this manner, several memory storage cartridges 50 can be set up one after another so that inventorying of several tracts of trees can be done using different cartridges 50 for different locations.

To add new inventory to a cartridge 50 that previously has been set up with tree location and variety information, a menu item for configuring a memory cartridge 50 to accept new inventory is selected. When selected, the software program causes all tree size and grade data previously stored on the cartridge 50 to be erased without erasing previously stored tree location and variety information. Thereafter, new tree size and grade information can be stored on the cartridge 50 during use out in the field.

To download data stored on the memory cartridge 50, a corresponding menu item from the cartridge menu is selected. This operation causes the tree data stored on the cartridge 50 to be downloaded and appended to master tree inventory data list stored on a disk of the computer 52 or in a memory of the computer 52 accessible by the software program.

To clear the cartridge 50 of tree data stored on the cartridge 50, another menu item selection for clearing the memory cartridge 50 can be selected. When clearing the memory storage cartridge 50, at least the tree size and grade information are erased leaving only the tree location and variety data previously stored on the cartridge 50. If desired, the software program can be modified to erase completely the memory cartridge 50.

To manually add tree information to the master tree inventory data list, a cartridge menu item can be selected to do so. When this menu item is selected, the user will be prompted to select the tree variety, location and to input the tree size and grade information. When completed, this additional tree information will be appended to the master tree inventory data list.

To sort the master tree inventory data list, a menu for reports is selected and a menu item for displaying or printing sorted inventory is further selected. When selected, the user is prompted to select the order of sorting or by which variable the master tree inventory data list will be sorted. If desired, the sort order can be controlled by the user such that the list can be sorted by grade, location, size and variety.

If desired, the sorted master tree inventory data list can be stored in ASCII format for use by another software program, such as a database, a spread sheet, a word processor, or the like. The sorted data can also be printed on a printer or another output device. If desired, the raw unmanipulated or unsorted data of the master tree inventory data list can also be printed.

To preserve or archive data, the master tree inventory data list can be backed up to a floppy drive while the list also stored on a hard drive. To review archived data, a previous inventory data list can be restored from a floppy to which the list had been previously been backed up using the software program, if desired.

VI. Use and Operation

A. Use

In use, the tree measurement apparatus 40 is used to measure the diameter of a plurality of standing trees and store this data for later use by a personal computer 52 in creating an inventory list of the trees measured with the list being referred to as a master tree inventory data list. Other data that is preferably stored during use of the measurement apparatus 50, along with tree diameter, includes tree grade, location and tree variety.

As a result, the measurement apparatus 40 of this invention is particularly well suited for use in inventorying the tree stock of a nursery where tree diameters are typically less than about ten inches and preferably no greater than about six inches. Additionally, the measurement apparatus 40 of this invention is also particularly well suited for use in inventorying standing trees that can be even larger in diameter for timber or lumber, such as for estimating board feet of lumber. Moreover, the measurement apparatus 40 of this invention preferably also can be used by the paper industry to automate the inventorying of stands of trees for use in estimating how much paper pulp is available from a particular stand of trees. Finally, while the measurement apparatus 40 of this invention is well suited for use in measuring trees that are standing, it preferably also can be used to measure and inventory trees that have been cut down or felled.

If desired, the measurement apparatus 40 of this invention can be used to measure and inventory articles which require diameter, a thickness, or a distance between two points to be measured as part of an inventory process. Such articles include, without limitation, pipes, metal tubing, metal blanks, and other goods for which a caliper type measurement head or its equivalent can be used.

B. Operation

To set up a memory cartridge 50 for use, the RS232 communications port 54 of the measurement apparatus 40 is connected by a cable 244 to an RS232 port of a personal computer 52 running the tree data processing software, such as the software defined by the source code in Appendix B. To set up the memory cartridge 50 for use, any pre-existing tree size and grade data on the cartridge 50 is erased and the tree location and tree varieties for the locations to be inventoried are downloaded from the personal computer 52 to the cartridge 50. During data transfer, the computer circuitry 242 of the measurement apparatus 40 is powered and the RESET key of the keypad 258 is pressed prior to data transfer to put the microcontroller, IC1, in a mode to enable the cartridge 50 to receive data.

In preparation for using the measurement apparatus 40 out in the field to measure and inventory trees, the POWER key of the keypad 258 is pressed to power up its computer circuitry 242. After being powered up, a message is shown on the display 46 preferably prompting the operator 60 to enter the location of the stand of trees that are to be inventoried. Preferably, at least two locations are shown in the display 46 during selection. To scroll up through the tree location list stored in the memory cartridge 50, the UP key is correspondingly pressed. To scroll down the tree location list, the DOWN key is correspondingly pressed. When the cursor shown in the display 46 is next to the desired tree location that is to be inventoried, the ENTER switch is pressed causing this location to be stored.

After tree location information is stored, a message is shown in the display 46 prompting the operator 60 to enter the variety of the tree that will immediately thereafter be inventoried. Similarly, the UP and DOWN keys can be pressed to scroll upwardly or downwardly through the tree variety list stored in the memory cartridge 50, at least two varieties of which are shown in the display 46 during tree variety selection. Each tree variety is shown on the display as the cursor moves up or down the list. When the cursor is next to the desired tree variety, the ENTER switch is pressed causing the selected tree variety to be stored. Preferably, pressing the ENTER key after selecting tree variety causes both tree location and variety to be written to or stored in memory chip, IC6, of the memory cartridge 50.

After tree location and variety have been selected, the measurement apparatus 40 is ready to measure the diameter of a tree 42. Preferably, the GRADE switch is toggled to select the appropriate grade of the tree upon inspection of the tree 42 to be measured by the operator 60. To measure tree diameter, the trunk of the tree 42 to be measured is placed between the open jaws 72 & 74 of the caliper 70 with the caliper jaws 72 & 74 being spaced above the ground by the support leg 118. The control handle 66 is pulled by the operator 60 toward the operator 60 to cause the movable caliper jaw 74 to move toward the fixed jaw 72.

During measurement, as the movable jaw 74 is being moved toward the fixed jaw 72, the locator slots 192 of the vernier tape 170 pass by optoisolators 206 & 208 causing IC1 to count the number of pulses signaled by the optoisolators. As pulses are counted, the diameter measurement shown on the display 46 is increased or decreased depending upon the direction of movement of the moveable jaw 74 relative to the fixed jaw 72.

When the tree engaging surfaces 142 & 146 of both jaws 72 & 74 bear against the tree 42, the approximate tree diameter is shown on the display 46. Preferably, after the jaws 72 & 74 engage the tree 42, the operator 60 presses the ENTER switch causing both the grade and the diameter of the tree 42 to be stored in the memory cartridge 50. When the ENTER key is pressed, the message "STORED" is preferably indicated on the display 46 to let the operator 60 know that the diameter and grade for that tree 42 have been stored. Thereafter, one tree after another can be graded and measured in this manner.

To enable rapid measurement and grade selection of several trees sequentially measured for trees of the same variety at the same location, an operator 60 does not have to repeatedly input tree location and variety before measuring every tree. By default and until changed by the operator 60, tree location and variety remain the same for all trees measured. By not requiring reentry of tree location and variety information for every tree, a considerable amount of data entry time is saved.

Preferably, after tree location and variety information have been entered, the location, variety, grade and size are shown in the display in the following format:

TREE VARIETY NAME

L=## G=# DIAM=#.##"

with

TREE VARIETY NAME being the actual or abbreviated tree name;

L being the location of the trees being measured;

G being the grade;

DIAM being the diameter of the tree (in inches or cm); and being representative of a character in the display.

After storage of tree diameter and grade for one tree, the display shown above allows grade to be inputted and diameter to be measured for another tree before being stored. If location, variety and grade have not changed, the operator 60 efficiently continues to grade and measure trees one after another in the manner previously discussed and thereafter presses the ENTER switch 80 to store the tree grade and diameter to the memory cartridge 50.

As a result of the GRADE and ENTER data entry switch 80 being conveniently located adjacent the handle grip 84 of the support handle 58, the GRADE and ENTER switch 80 can be quickly pressed by a thumb or forefinger of the operator 60 making data selection and storage fast and easy. As a result of the advantageous construction and arrangement of the GRADE/ENTER switch 80, several hundred trees can be quickly and easily measured, graded and inventoried.

If it is desired to change location or to change variety, the RESET key can be pressed to cause the microcontroller, IC1, to reset resulting in the operator 60 thereafter being inquired to input tree location and variety. Upon changing the location and/or variety, tree grading and measurement proceed in the aforementioned manner.

If a memory storage cartridge 50 becomes full and cannot store any more tree measurement, grading, location or variety data, it preferably can be removed from the measurement apparatus 40 and replaced with another cartridge 50. Similarly, if another location is being measured, an installed cartridge can be removed and another cartridge, preferably preconfigured for the new location, can be installed.

After inventorying trees in the field is completed, a cable 244 is preferably connected between the RS232 ports of the measurement apparatus 40 and personal computer 52 and the tree data processing software is run on the personal computer 52. After the cable 244 is connected, the RESET key is pressed to put the microcontroller, IC1, of the measurement apparatus 40 in a mode to enable data transfer. Thereafter, the data processing software can be used to download the tree inventory data stored on the cartridge 50 connected to the measurement apparatus 40, can erase the cartridge 50, can reconfigure the cartridge 50 with new location and variety information, can sort, display and print the tree data, and/or can store the downloaded tree data in ASCII format, for example.

It is also to be understood that, although the foregoing description and drawings describe and illustrate in detail one or more embodiments of the present invention, to those skilled in the art to which the present invention relates, the present disclosure will suggest many modifications and constructions, as well as widely differing embodiments and applications, without thereby departing from the spirit and scope of the invention. The present invention, therefore, is intended to be limited only by the scope of the appended claims and the applicable prior art.

What is claimed is:

1. An apparatus for measuring a characteristic of a tree comprising:
    (a) a support handle having a portion that can be grasped by an operator of the apparatus;
    (b) a measurement head operably connected to said support handle for measuring a characteristic of a tree;
    (c) an extension wand operably connecting said measurement head to said support handle; and
    (d) wherein said measurement head is obtusely angled relative to said wand to allow said characteristic of said tree to be measured while said operator is standing.

2. The tree characteristic measurement apparatus of claim 1 further comprising a control handle carried by said wand remote from said measurement head to facilitate maneuvering said measurement head relative to a tree whose characteristic is being measured and wherein said extension wand is at least about thirty inches long for spacing said measurement head from said support handle to allow a characteristic of a tree to be measured while said operator is standing.

3. The tree characteristic measurement apparatus of claim 2 further comprising an adjustable bracket operably connecting said measurement head to said wand to enable the angle of said head relative to said wand to be adjusted between a position where it is obtusely angled relative to said wand and another position where it is acutely angled relative to said wand.

4. The tree characteristic measurement apparatus of claim 2 wherein said tree characteristic being measured is tree diameter, said measurement head is constructed and arranged to measure tree diameter, and further comprising an extension support leg operably connected to one of said measurement head and said wand with said support leg constructed and arranged for bearing against a portion of the ground to space said measurement head from the ground.

5. The tree characteristic measurement apparatus of claim 1 wherein said measurement head is constructed and arranged to measure a diameter of a tree.

6. The tree characteristic measurement apparatus of claim 5 further comprising:
    (a) a movable control handle carried by one of said support handle and said wand; and
    (b) a caliper carried by said measurement head and having a pair of opposed jaws with one of said jaws operably connected to said control handle such that movement of said control handle moves one of said jaws relative to the other of said jaws from a home position to a position disposed from said home position for enabling a tree received between said jaws to be contacted by said jaws.

7. The tree characteristic measurement apparatus of claim 6 wherein only one of said jaws is movable relative to the other of said jaws.

8. The tree characteristic measurement apparatus of claim 6 wherein said movable jaw is carried by said measurement head and moves relative to said measurement head and the other of said jaws.

9. The tree characteristic measurement apparatus of claim 6 wherein said control handle is operably connected to said movable jaw by a flexible motion transmitter for moving said movable jaw in response to movement of said control handle.

10. The tree characteristic measurement apparatus of claim 9 wherein (a) the other of said jaws is fixed to and carried by said measurement head, (b) said movable jaw is carried by said measurement head and disposed between said fixed jaw and said wand and (c) further comprising a pulley carried by said measurement head wherein said flexible motion transmitter is a cable having one end operably connected to said control handle, a portion of said cable looped about said pulley and the other end of said cable operably connected to said movable jaw to enable said movable jaw to be moved by moving said control handle.

11. The tree characteristic measurement apparatus of claim 10 wherein said control handle is carried by said wand and can be moved toward and away from said measurement head and wherein said measurement head, cable, movable jaw and control handle are constructed and arranged such that movement of said control handle away from said measurement head moves said movable jaw toward said fixed jaw and movement of said control handle toward said measurement head moves said movable jaw away from said fixed jaw and toward said home position of said movable jaw.

12. The tree characteristic measurement apparatus of claim 11 further comprising a biasing element having one end operably connected to one of said measurement head and said wand and its other end operably connected to said moveable jaw for urging said moveable jaw away from said fixed jaw.

13. The tree characteristic measurement apparatus of claim 12 wherein said biasing element is a spring urging said movable jaw toward said home position and away from said fixed jaw.

14. The tree characteristic measurement apparatus of claim 13 1) wherein said movable jaw can be moved between i) a closed position where said movable jaw bears against said fixed jaw and ii) a fully open position spaced from said fixed jaw and 2) wherein said home position of said movable jaw comprises said movable jaw disposed in its fully open position.

15. The tree characteristic measurement apparatus of claim 12 wherein said pulley is carried by a block attached to a plug by a threaded member with said plug being received in the free end of said measurement head for adjusting the position of said pulley relative to the free end of said measurement head to enable the home position location of said movable jaw to be adjusted relative to said fixed jaw.

16. The tree characteristic measuring apparatus of claim 1 wherein said measurement head comprises a caliper having a pair of opposed jaws with one of said jaws movable relative to the other of said jaws and further comprising:

(a) a sensor in communication with said movable jaw for sensing the position of said movable jaw and generating a signal in response thereto;

(b) a computer in communication with said sensor to read said signal received from said sensor and to determine the position of said movable jaw for determining the distance between said movable jaw and the other said jaw;

(c) a display in communication with said computer for displaying the distance between said movable jaw and the other said jaw;

(d) a memory in communication with said computer for enabling the distance between said jaws to be stored in memory; and (e) an input in communication with said computer for storing the distance between said jaws in said memory.

17. The tree characteristic apparatus of claim 16 further comprising a handle grip carried by said support handle for being grasped by a hand of an operator and wherein said input is carried by said support handle adjacent said handle grip and positioned to be within reach of a thumb or finger of a hand of an operator while said hand is grasping said handle grip for enabling the distance between said jaws to be stored in said memory by engaging said input with said finger or thumb.

18. The tree characteristic apparatus of claim 17 wherein said input comprises a switch that sends a signal to said computer when said switch is engaged by being pressed causing the distance between said jaws to be stored in memory.

19. The tree characteristic apparatus of claim 16 wherein said memory comprises an electrically erasable programmable read only memory received in a cartridge housing for enabling it to be selectively connected to said computer and selectively disconnected from said computer.

20. The tree characteristic apparatus of claim 19 further comprising a communications port in communication with said computer and said memory for enabling data stored in memory to be transferred to a personal computer in communication with said port.

21. The tree characteristic apparatus of claim 20 wherein said communications port is capable of bidirectional communication for enabling information from said personal computer to be stored in said memory.

22. The tree characteristic apparatus of claim 21 wherein said information transferred from said personal computer to said memory is used to configure said memory with information used during operation of the apparatus.

23. The tree characteristic apparatus of claim 21 wherein said communications port is an RS232 port.

24. The tree characteristic measuring apparatus of claim 16 further comprising a vernier in operable communication with one of said movable jaw and said control handle and said vernier having a plurality of spaced apart slots, and wherein said sensor comprises at least one slot sensor having an emitter on one side of said vernier and a detector on the other side of said vernier that is generally aligned with said emitter for communicating a signal to said computer when one of said slots is located between said emitter and detector.

25. The tree characteristic apparatus of claim 24 further comprising a movable control handle and a flexible motion transmitter operably connecting said movable control handle to said movable jaw and wherein said vernier is carried by said flexible motion transmitter for movement substantially in unison with said movable jaw.

26. The tree characteristic measurement apparatus of claim 24 wherein said slot sensor comprises an optoisolator having 1) an emitter of light energy that is a light emitting diode and 2) a detector of light energy that is a phototransistor or photoresistor.

27. The tree characteristic measurement apparatus of claim 26 wherein said slots in said vernier form an array of measurement locator slots having each pair of adjacent slots spaced apart by a first fixed distance and said vernier has a home reference position indicating slot spaced apart by a second fixed distance from one of said slots that is located at one end of said slot array for providing a home reference position for enabling detection of when said movable jaw is located in a home position.

28. The tree characteristic measurement apparatus of claim 27 1) wherein said slot sensor comprises a pair of measurement locator optoisolators for sensing said slots in said measurement locator slot array and communicating to said computer when one of said slots is generally aligned with one of said optoisolators and 2) wherein said pair of optoisolators and said computer form a quadrature detector for sensing direction and distance of movement of said vernier and said movable jaw, and 3) further comprising a home reference position detecting optoisolator for i) detecting said home reference position slot and ii) signalling said computer to indicate when said movable jaw is located in said home position.

29. The tree characteristic measurement apparatus of claim 28 wherein said home reference position slot is generally aligned with said home reference position optoisolator and one of said slots of said measurement locator slot array is generally aligned with each said measurement locator optoisolator for detecting when said movable jaw is in said home position.

30. The tree characteristic measurement apparatus of claim 29 wherein said pair of optoisolators are spaced apart from each other by a distance that is less than or greater than said first fixed distance between adjacent measurement locator slots.

31. The tree characteristic measurement apparatus of claim 30 wherein said microprocessor determines how far said vernier has moved from said reference position by counting how many times slots of said measurement locator slot array pass by said pair of measurement locator optoisolators.

32. The tree characteristic measurement apparatus of claim 27 wherein said distance between adjacent slots of said measurement locator slot array is no greater than about 0.25 inches.

33. The tree characteristic measurement apparatus of claim 18 wherein said memory is constructed and arranged to store the following data for said tree comprising (1) the distance between said jaws, (2) a location of said tree, (3) a variety of said tree, and (4) a grade of said tree.

34. The tree characteristic measurement apparatus of claim 33 wherein said switch is constructed and arranged having a first position in communication with said computer for storing data in memory and a second position in communication with said computer for selecting said grade of said tree.

35. The tree characteristic measurement apparatus of claim 33 wherein said data for a particular tree is stored in a record in said memory and said memory is constructed and arranged to hold a plurality of said records.

36. The tree characteristic measurement apparatus of claim 35 wherein said memory can hold at least about 1000 of said records.

37. The tree characteristic measurement apparatus of claim 2 further comprising a shoulder strap carried by one of said support handle and said extension wand for supporting the apparatus.

38. A measurement apparatus for measuring a characteristic of a tree comprising:
   (a) a frame;
   (b) a measurement head carried by said frame and having a caliper with a pair of jaws for enabling measurement of the diameter of a tree located between said jaws;
   (c) a support handle carried by said frame and having a handle grip for being grasped by a hand of an operator;
   (d) an extension wand carried by said frame and joining said measurement head to said support handle, said wand having a length suitable to enable measurement of tree diameter to be performed while said operator is standing up, said measurement head obtusely and adjustably angled relative to said wand;
   (e) a computer carried by said frame and in communication with said caliper for determining the distance between said caliper jaws for enabling the diameter of a tree between said jaws to be determined;
   (f) a memory in communication with said computer for selectively storing tree diameter;
   (g) a data entry input in communication with said computer with said data entry input carried by said support handle adjacent said handle grip and positioned to be within reach of a thumb or finger of said hand of said operator while said hand is grasping said handle grip.

39. The tree characteristic measurement apparatus of claim 38 further comprising:
   (a) a source of electrical power;
   (b) a power supply circuit for supplying regulated electrical power to said computer and said memory;
   (c) display in communication with said computer for displaying alphanumeric characters;
   (d) a list of tree locations accessible by said computer;
   (e) a list of tree varieties accessible by said computer; and
   (f) a keypad in communication with said computer with said keypad having a first key for causing electrical power to be supplied to said computer, a second key for scrolling in one direction through one of said lists when at least a portion of one of said lists is displayed on said screen, and a third key for scrolling in the opposite direction through one of said lists when at least a portion of one of said lists is displayed on said screen.

40. The tree characteristic measuring apparatus of claim 39 wherein said data entry input comprises a switch having a first position for storing data in said memory and a second position for selecting a tree grade shown on said display.

41. The tree characteristic measurement apparatus of claim 39 further comprising a control handle carried by said wand and has a handle grip for being grasped by the other hand of said operator and wherein said keypad is carried by said frame interjacent said support handle grip and said control handle grip for easy access by said operator.

42. A method of measurement a characteristic of a tree comprising:
   (a) providing a frame having a support handle for being grasped by an operator, a measurement head for measuring the tree characteristic, a wand operably connecting the measurement head to the support handle, a computer carried by the frame, a memory in communication with the computer for storing tree characteristic data, a display carried by the frame capable of displaying alphanumeric characters, an input device in communication with the computer having a first input enabling data to be selected and a second input enabling data to be stored in memory;
   (b) selecting the location of a tree being measured;
   (c) selecting the variety of the tree being measured;
   (d) storing to memory the selected location data entry and variety data entry;
   (e) selecting a grade of the tree being measured;
   (f) measuring the characteristic of the tree; and
   (g) storing the grade data and characteristic measured data in memory.

43. The method of claim 42 wherein tree location and tree variety are stored substantially simultaneously in memory and the tree characteristic measurement and grade are stored substantially simultaneously in memory.

44. The method of claim 42 wherein after entry of tree location and tree variety, the tree location and tree variety do not have to be changed for all trees measured of that variety and location.

45. The method of claim 44 wherein the tree characteristic measured is tree diameter and for a plurality of trees of the same location and variety only grade is selected and diameter measured before storing grade and diameter in memory without requiring reentry of location and variety for each tree of the same location.

46. The method of claim 45 further comprising a handle grip carried by the support handle and wherein the data storage input comprises a data entry switch carried by the frame adjacent the handle grip and within reach of a thumb or finger of a hand grasping the handle grip.

47. The method of claim 46 wherein the data entry switch has a first position for selecting the grade of a tree being measured and a second position for storing the grade and tree diameter measurement of the tree during step (e) the switch is moved to its first position to select the desired grade and during step (g) the switch is moved to its second position to store both the diameter measurement and grade in memory.

48. The method of claim 42 further comprising a list of tree locations and a list of tree varieties both stored in memory and during step (b) at least a portion of the tree location list is shown in the display and the data selection input is manipulated by an operator to select the desired tree location, during step (c) at least a portion of the tree variety list is shown in the display and the data selection input is manipulated by the operator to select the desired tree variety, and during step (d) the data storage input is manipulated to store the selected tree location and tree variety to memory.

49. The method of claim 48 further comprising (1) providing a communications port connected to said computer, a personal computer, a link between the communications port and the personal computer and wherein the memory has a first portion for storing tree location data, tree variety data, grade data and tree diameter measurements and a second portion for storing the list of selectable tree locations and the list of selectable tree varieties;

(2) creating a list of tree locations;

(3) creating a list of tree varieties;

(4) transferring at least a portion of the tree location list and the tree variety list from the personal computer to the memory via the link between the communications port and the personal computer wherein they are stored in the second portion of the memory.

50. The method of claim 49 further comprising the step of transferring tree location data, tree variety data, tree grade data and tree diameter data from the memory to the personal computer.

51. The method of claim 48 wherein the data selection input comprises a keypad having a key for scrolling in one direction through a portion of a tree location or tree variety list shown in the display and another key for scrolling the other direction through a portion of a tree location or tree variety list shown in the display.

52. The tree characteristic measurement apparatus of claim 4 wherein said support leg further comprises an elongate rod connected to a support pad that engages the ground with said leg carried by said adjustable bracket and constructed and arranged such that it can be selectively extended or retracted relative to said measurement head to selectively control the distance said measurement head is spaced from the ground.

53. The tree characteristic measurement apparatus of claim 36 wherein said memory can hold as many as 7,870 of said records.

54. The tree characteristic measurement apparatus of claim 38 wherein said memory comprises a cartridge memory storage unit that can be removed from the apparatus.

55. An apparatus for measuring a diameter of a tree comprising:

(a) a support handle having a portion that can be grasped by a human operator;

(b) a caliper having a pair of opposed jaws with one of said jaws movable relative to the other of said jaws;

(c) an extension wand connected adjacent one end to said support handle and connected adjacent an opposite end to said caliper;

(d) a movable control handle carried by one of said support handle and said extension wand;

(e) a flexible motion transmitter connecting said movable control handle to said movable jaw for translating motion of said movable control handle into movement of said movable jaw;

(f) a vernier 1) having a plurality of spaced apart slots and 2) that moves substantially in unison with said movable jaw;

(g) a slot sensor that senses movement of said vernier by sensing said slots in said vernier and outputting a signal;

(h) a computer connected to said slot sensor for receiving said signal and determining from said signal how far said movable jaw is located from the other said jaw.

56. An apparatus for measuring a characteristic of a tree comprising:

(a) a support handle having a portion that can be grasped by an operator of the apparatus;

(b) a measurement head operably connected to said support handle for measuring a characteristic of a tree;

(c) an extension wand operably connecting said measurement head to said support handle; and (d) a control handle carried by said wand remote from said measurement head to facilitate maneuvering said measurement head relative to a tree whose characteristic is being measured while said operator is standing.

57. The tree characteristic measurement apparatus of claim 56 wherein said measurement head is obtusely and adjustably angled relative to said wand to allow a characteristic of a tree to be measured while said operator is standing.

58. The tree characteristic measurement apparatus of claim 56 wherein said extension wand is at least about 20 inches long for spacing said measurement head from said support handle to allow a characteristic of a tree to be measured while said operator is standing.

59. The tree characteristic measurement device of claim 56 wherein the tree characteristic comprises tree size.

60. The tree characteristic measurement device of claim 59 wherein the tree characteristic comprises tree diameter.

61. The tree characteristic measurement device of claim 56 wherein the tree characteristic comprises tree location.

62. The tree characteristic measurement device of claim 56 wherein the tree characteristic comprises tree grade.

* * * * *